United States Patent
Seo et al.

(10) Patent No.: US 12,010,624 B2
(45) Date of Patent: Jun. 11, 2024

(54) MONITORING OF POWER SAVING SIGNAL AND PHYSICAL DOWNLINK CONTROL CHANNEL

(71) Applicant: LG ELECTRONICS INC., Seoul (KR)

(72) Inventors: Inkwon Seo, Seoul (KR); Joonkui Ahn, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 17/428,935

(22) PCT Filed: Feb. 11, 2020

(86) PCT No.: PCT/KR2020/001876
§ 371 (c)(1),
(2) Date: Aug. 5, 2021

(87) PCT Pub. No.: WO2020/166925
PCT Pub. Date: Aug. 20, 2020

(65) Prior Publication Data
US 2022/0132425 A1 Apr. 28, 2022

(30) Foreign Application Priority Data

Feb. 14, 2019 (KR) .................. 10-2019-0017446
Feb. 14, 2019 (KR) .................. 10-2019-0017463
Feb. 14, 2019 (KR) .................. 10-2019-0017468

(51) Int. Cl.
*H04W 52/02* (2009.01)
*H04W 72/044* (2023.01)
*H04W 72/23* (2023.01)

(52) U.S. Cl.
CPC ... *H04W 52/0235* (2013.01); *H04W 52/0232* (2013.01); *H04W 72/044* (2013.01); *H04W 72/23* (2023.01)

(58) Field of Classification Search
CPC ......... H04W 52/0235; H04W 52/0232; H04W 52/02; H04W 72/044; H04W 72/23; Y02D 30/70
See application file for complete search history.

(56) References Cited

U.S. PATENT DOCUMENTS

| | | | |
|---|---|---|---|
| 2017/0135135 A1* | 5/2017 | Pelletier | H04L 1/0072 |
| 2019/0297577 A1* | 9/2019 | Lin | H04W 52/0235 |
| 2022/0110057 A1* | 4/2022 | Wang | H04W 52/0216 |

FOREIGN PATENT DOCUMENTS

| | | | | |
|---|---|---|---|---|
| WO | WO-2018169649 A1 * | 9/2018 | ........... | H04L 5/0053 |
| WO | WO-2018175760 A1 * | 9/2018 | ........ | H04W 52/0216 |

OTHER PUBLICATIONS

Samsung, "On UE adaptation Schemes", R1-1901087, 3GPP TSG RAN WG1 Ad-Hoc Meeting 1901, Taipei, Taiwan, Jan. 21-25, 2019, see pp. 1-13.

(Continued)

*Primary Examiner* — Farid Seyedvosoghi
(74) *Attorney, Agent, or Firm* — BRYAN CAVE LEIGHTON PAISNER LLP

(57) ABSTRACT

The present disclosure proposes monitoring of a power saving signal and a physical downlink control channel.

20 Claims, 36 Drawing Sheets

(56) References Cited

OTHER PUBLICATIONS

Oppo, "UE adaptation to the traffic for UE power saving", R1-1810976, 3GPP TSG RAN WG1 Meeting #94bis, Chengdu, China, Oct. 8-12, 2018, see pp. 1-8 and figures 3-6, 14.
Qualcomm Incorporated, "UE Adaptation to the Traffic and UE Power Consumption Characteristics", R1-1900911, 3GPP TSG-RAN WG1 Ad-Hoc Meeting 1901, Taipei, Taiwan, Jan. 21-25, 2019, see pp. 1-24.
Interdigital, Inc., "On Power Saving Techniques", R1-1900813, 3GPP TSG RAN WG1 Ad-Hoc Meeting 1901, Taipei, Taiwan, Jan. 21-25, 2019, see sections 1-3.
Nokia et al., "On UE adaptation to the traffic", R1-1901188, 3GPP TSG RAN WG1 Ad-Hoc #1901, Taipei, Taiwan, Jan. 21-25, 2019, see sections 1-3.

\* cited by examiner

MONITORING OF POWER SAVING SIGNAL AND PHYSICAL DOWNLINK CONTROL CHANNEL

This application is the National Stage filing under 35 U.S.C. 371 of International Application No. PCT/KR2020/001876, filed on Feb. 11, 2020, which claims the benefit of Korean Patent Application No. 10-2019-0017468, filed on Feb. 14, 2019, Korean Patent Application No. 10-2019-0017446, filed on Feb. 14, 2019 and Korean Patent Application No. 10-2019-0017463, filed on Feb. 14, 2019, the contents of which are all hereby incorporated by reference herein in their entirety.

BACKGROUNDS

Field of the Description

The disclosure relates to wireless communication.

RELATED ART

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication. In addition, designs for communication systems considering services or user equipments (UEs) sensitive to reliability and latency are under discussion. Introduction of next-generation RAT considering enhanced mobile broadband communication, massive MTC, and ultra-reliable and low-latency communication (URLLC) is under discussion. In the disclosure, for convenience of description, this technology may be referred to as new RAT or new radio (NR).

One of main discussions of NR is a problem for power saving of UE, and the present disclosure proposes methods for performing monitoring operation of a signal in consideration of power saving for UE.

SUMMARY

According to the present disclosure, UE can perform physical downlink control channel (PDCCH) monitoring operation based on power saving signal.

According to the disclosure, UE can reduce unnecessary PDCCH blind decoding and increase sleep maintenance time. Accordingly, power consumption of PDCCH monitoring can decrease.

Effects obtained through specific examples of this specification are not limited to the foregoing effects. For example, there may be a variety of technical effects that a person having ordinary skill in the related art can understand or derive from this specification. Accordingly, specific effects of the disclosure are not limited to those explicitly indicated herein but may include various effects that may be understood or derived from technical features of the disclosure.

DESCRIPTION OF EXEMPLARY
EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Figure 1:
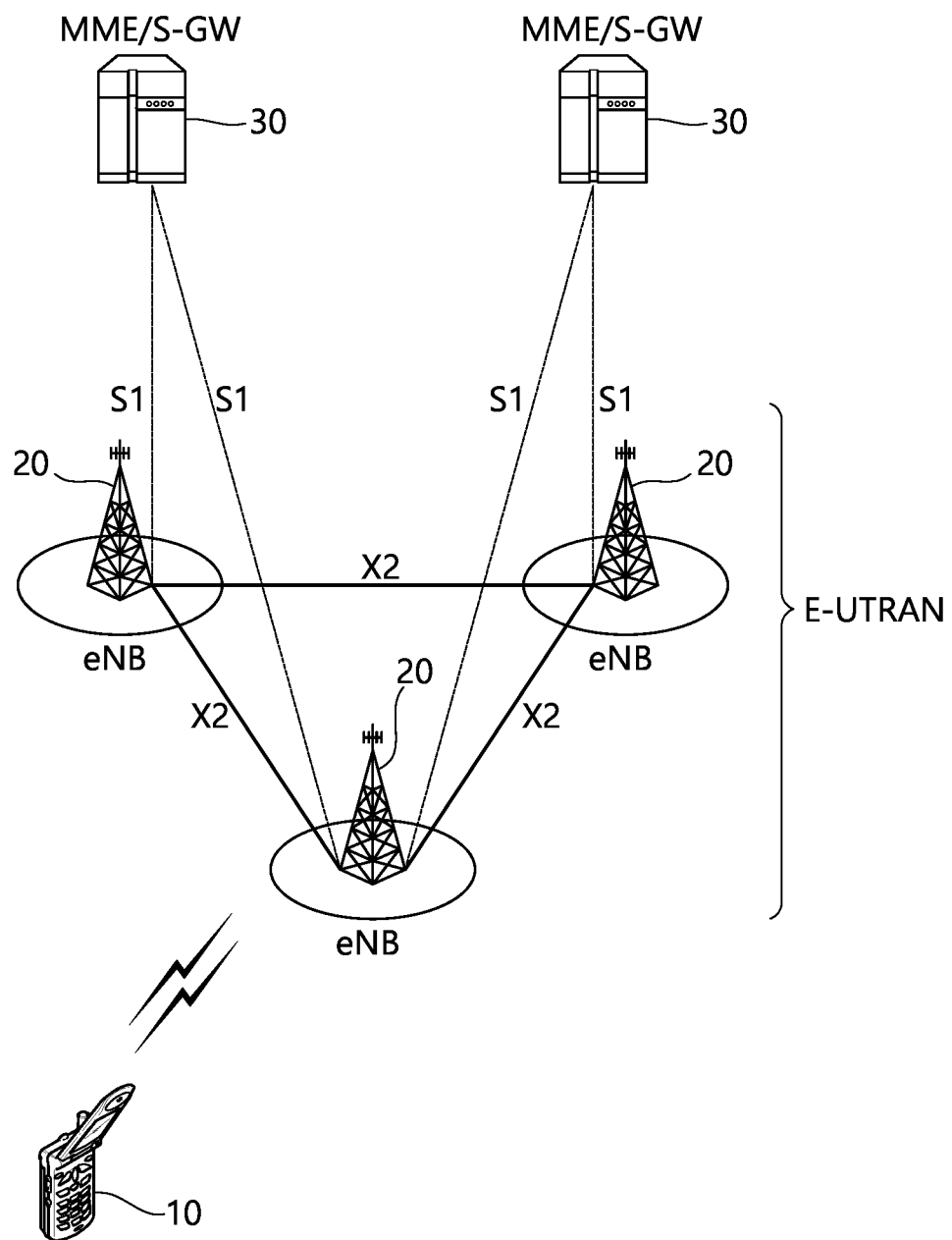
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
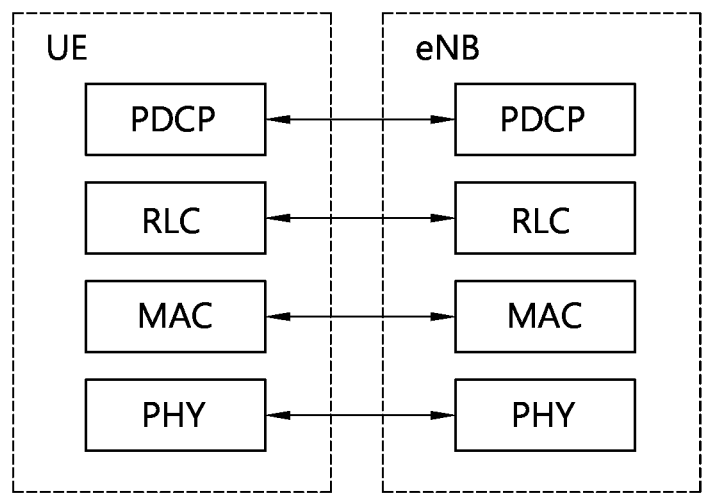
FIG. 2 is a diagram showing a wireless protocol architecture for a user plane.
Figure 3:
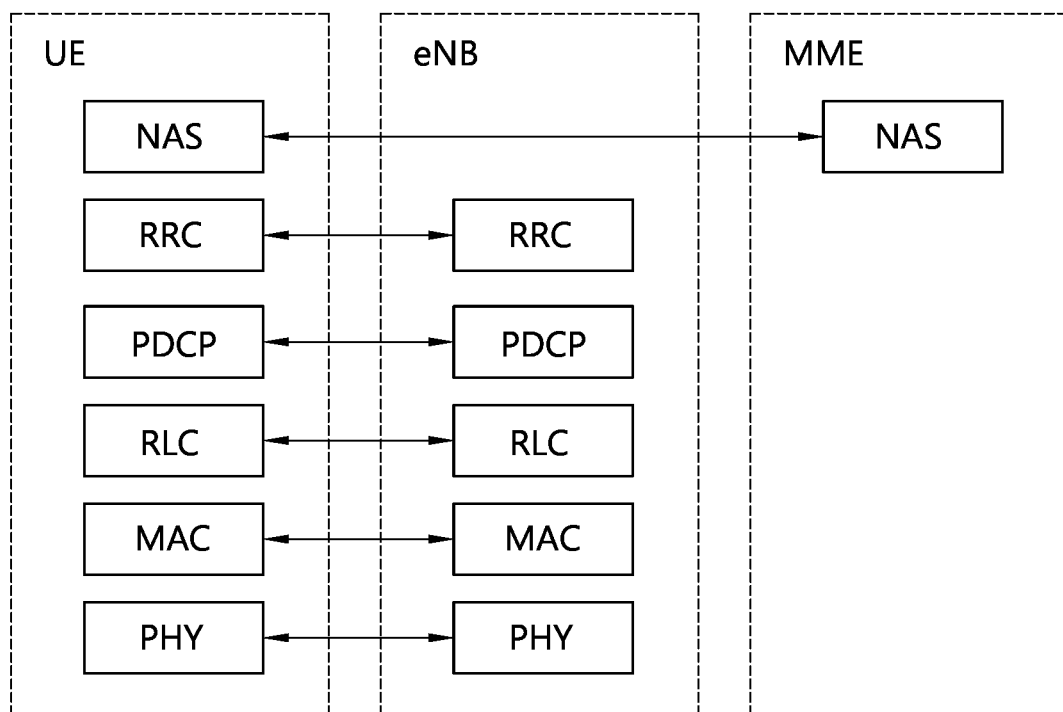
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time (e.g., slot, symbol) for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
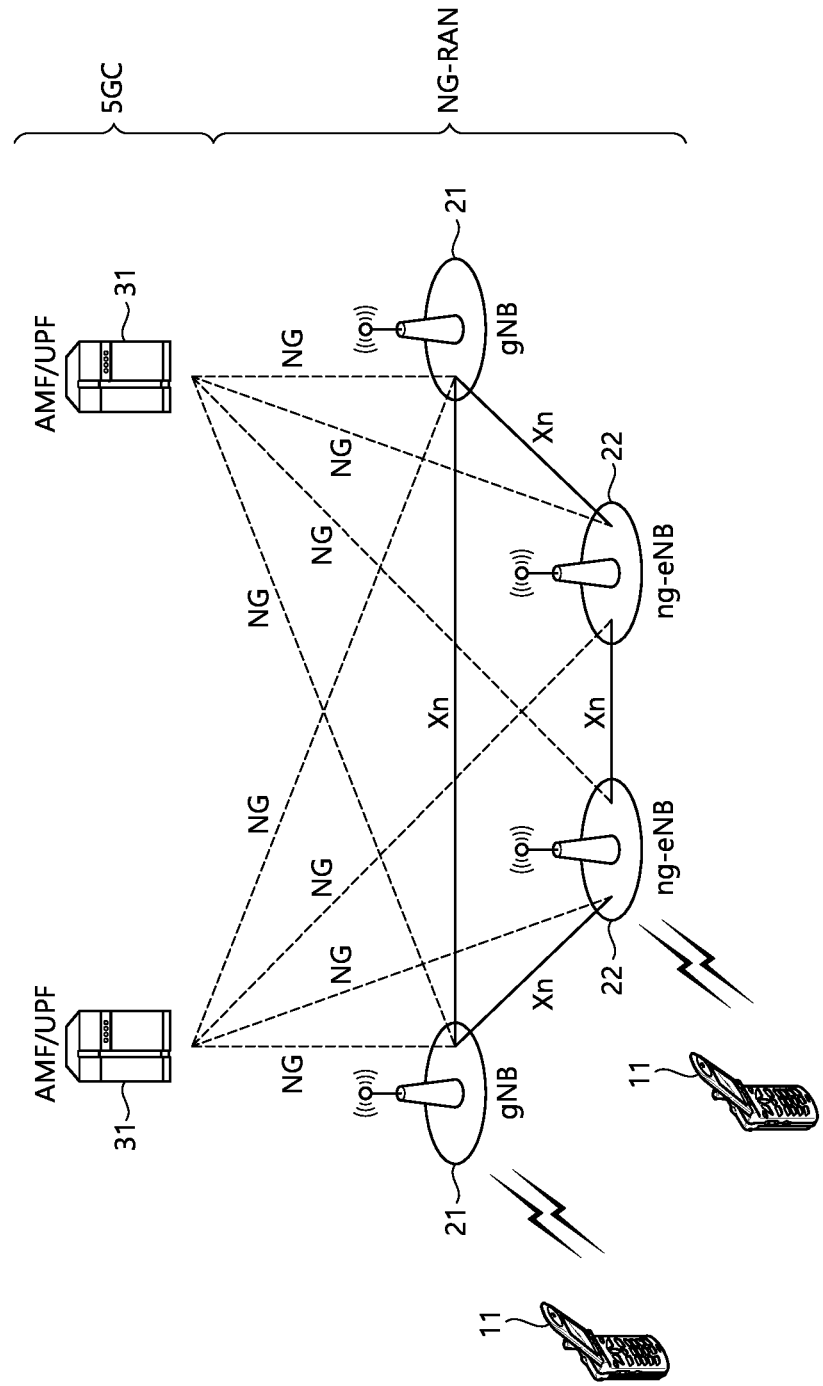
FIG. 4 illustrates another wireless communication system to which the technical features of the present disclosure may be applied.

FIG. 4 shows another example of a wireless communication system to which a technical feature of the present disclosure can be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a 5$^{th}$ generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and control plane protocol terminations towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
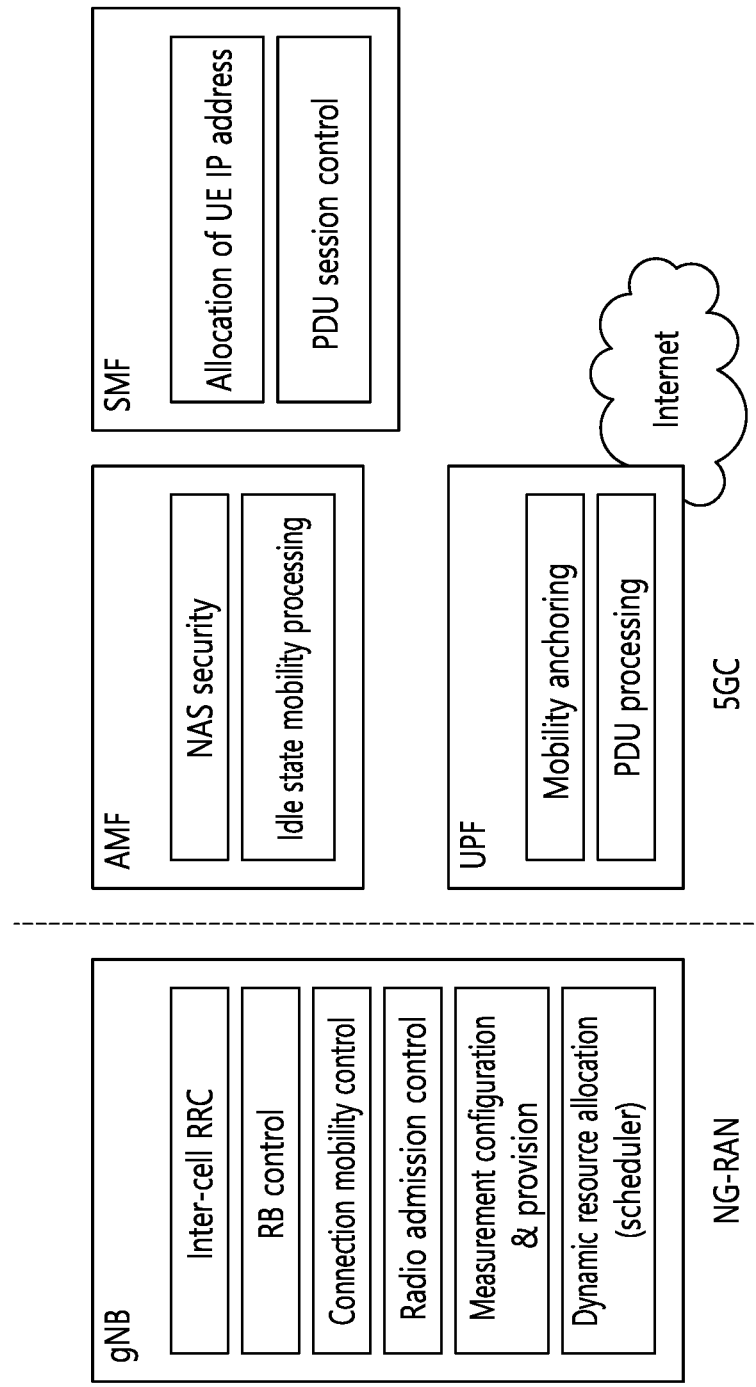
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
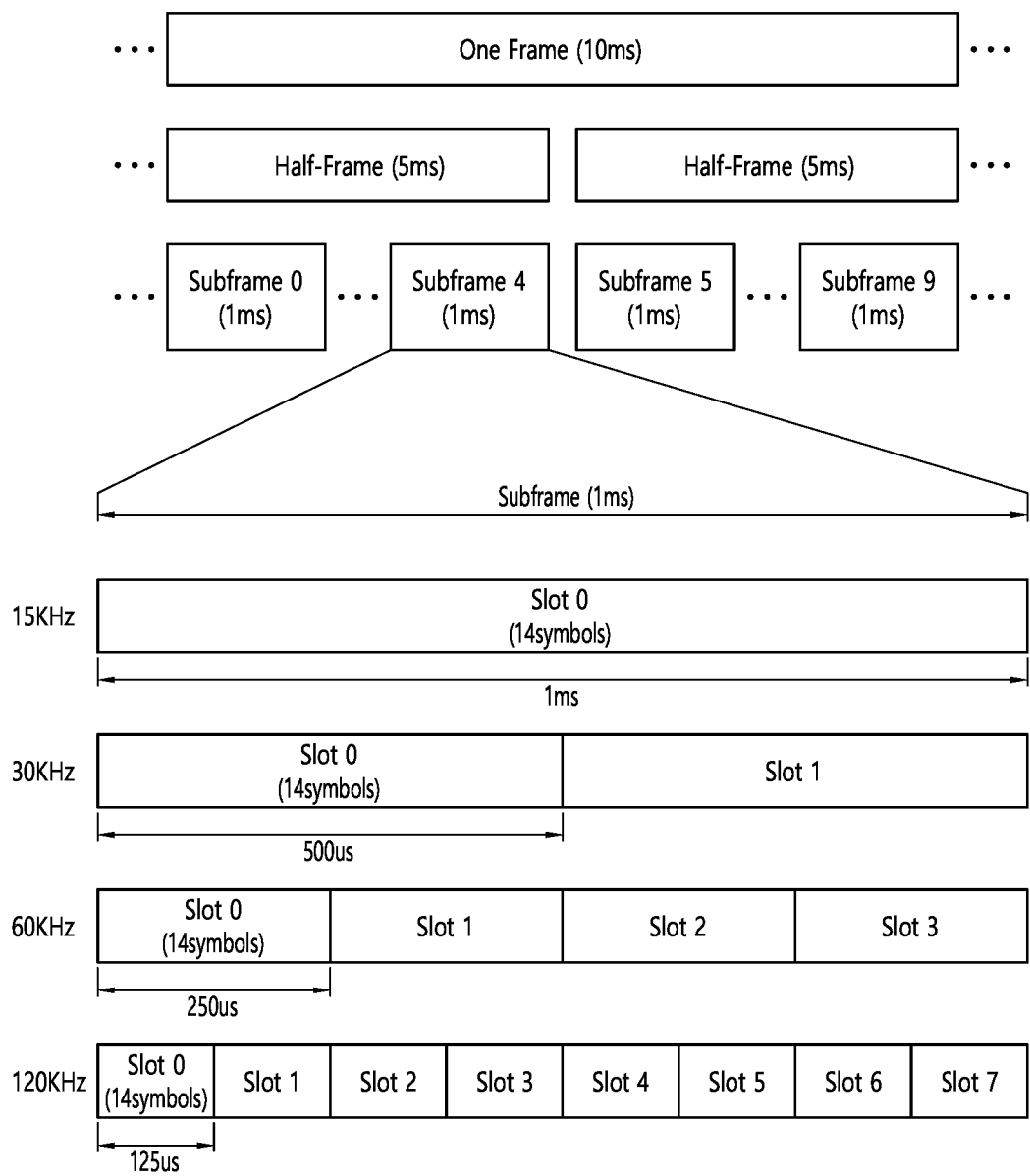
FIG. 6 illustrates an example of a frame structure that may be applied in NR.

FIG. 6 illustrates a frame structure applicable in NR.

Referring to FIG. 6, a frame may be configured to have a length of 10 millisecond (ms), and may include 10 subframes each having a length of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in the SF according to a subcarrier spacing.

The following table 1 illustrates a subcarrier spacing configuration μ.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal |
|  |  | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS($15*2^\mu$) | $N^{slot}_{symb}$ | $N^{frame,\mu}_{slot}$ | $N^{subframe,\mu}_{slot}$ |
|---|---|---|---|
| 60 KHz (μ = 2) | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
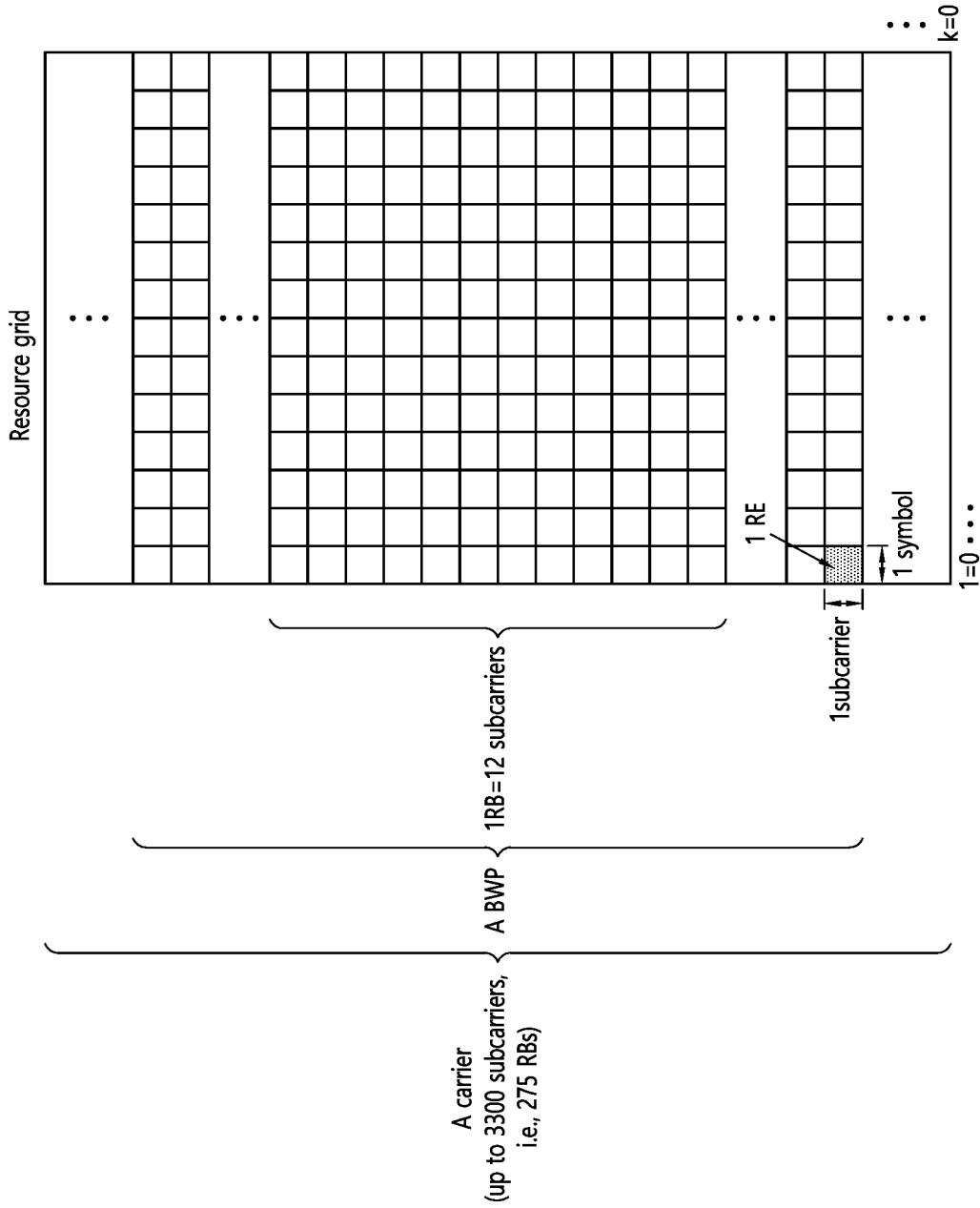
FIG. 7 illustrates a slot structure.

FIG. 7 illustrates a slot structure.

Referring to FIG. 7, a slot includes a plurality of symbols in a time domain. For example, in case of a normal CP, one slot may include 14 symbols. However, in case of an extended CP, one slot may include 12 symbols. Alternatively, in case of the normal CP, one slot may include 7 symbols. However, in case of the extended CP, one slot may include 6 symbols.

A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, and so on). The carrier ma include up to N (e.g., 5) BWPs. Data communication may be performed through an activated BWP. Each element may be referred to as a resource element (RE) within a resource grid, and one complex symbol may be mapped thereto.

A physical downlink control channel (PDCCH) may include one or more control channel elements (CCEs) as illustrated in the following table 4.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

A new unit called a control resource set (CORESET) may be introduced in the NR. The UE may receive a PDCCH in the CORESET.

Figure 8:
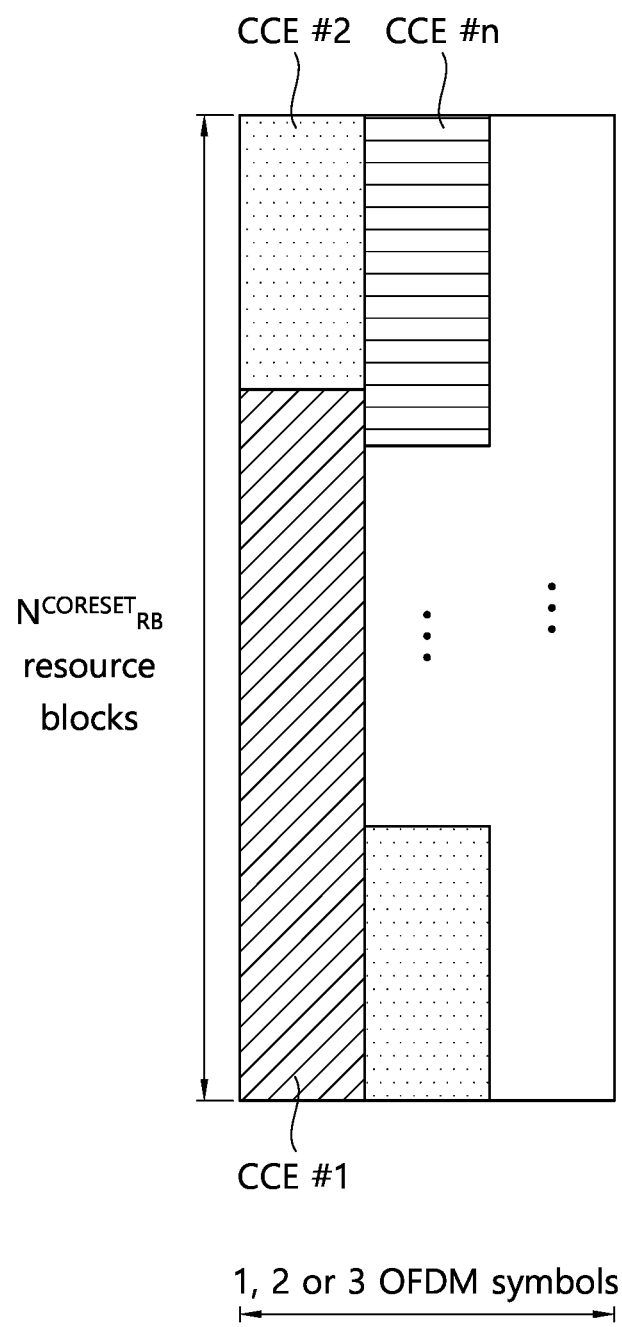
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 9:
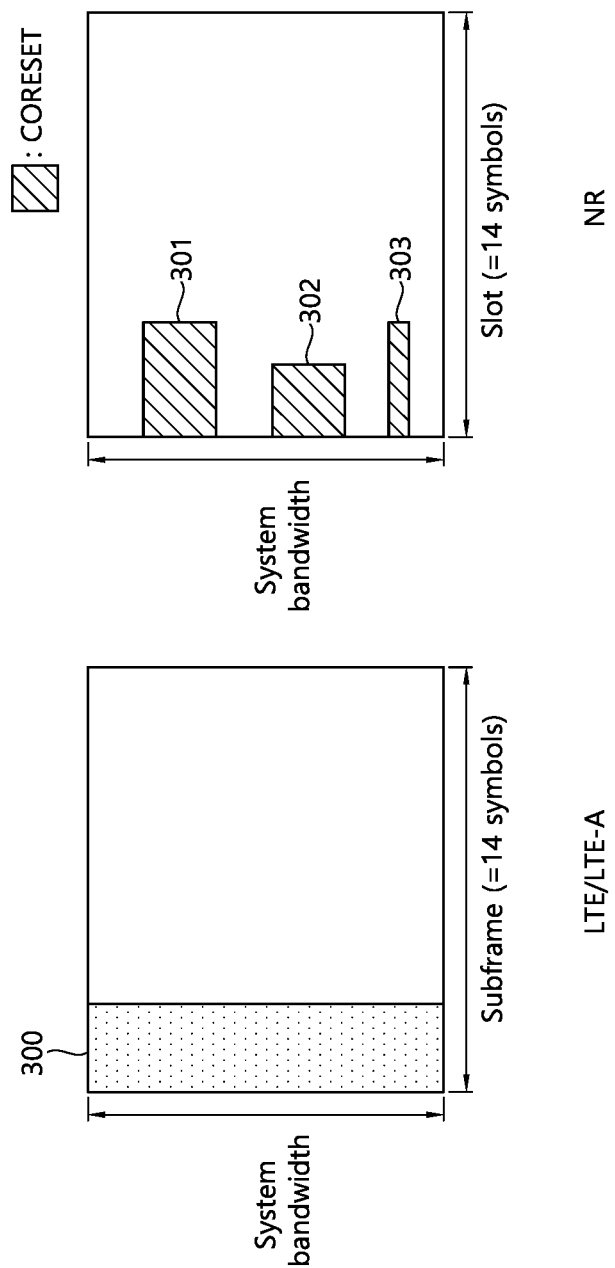
FIG. 9 is a diagram illustrating a difference between a related art control region and the CORESET in NR.

FIG. 9 is a diagram illustrating a difference between a related art control region and the CORESET in NR.

Referring to FIG. 9, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 9, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
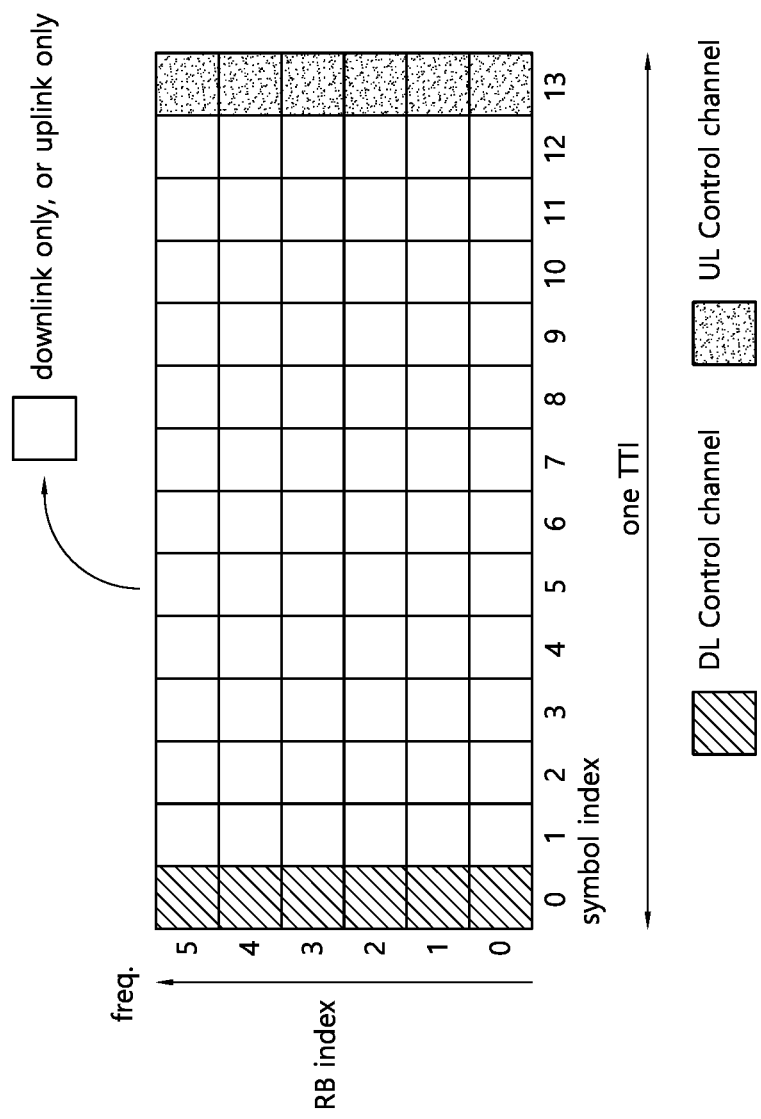
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 11:
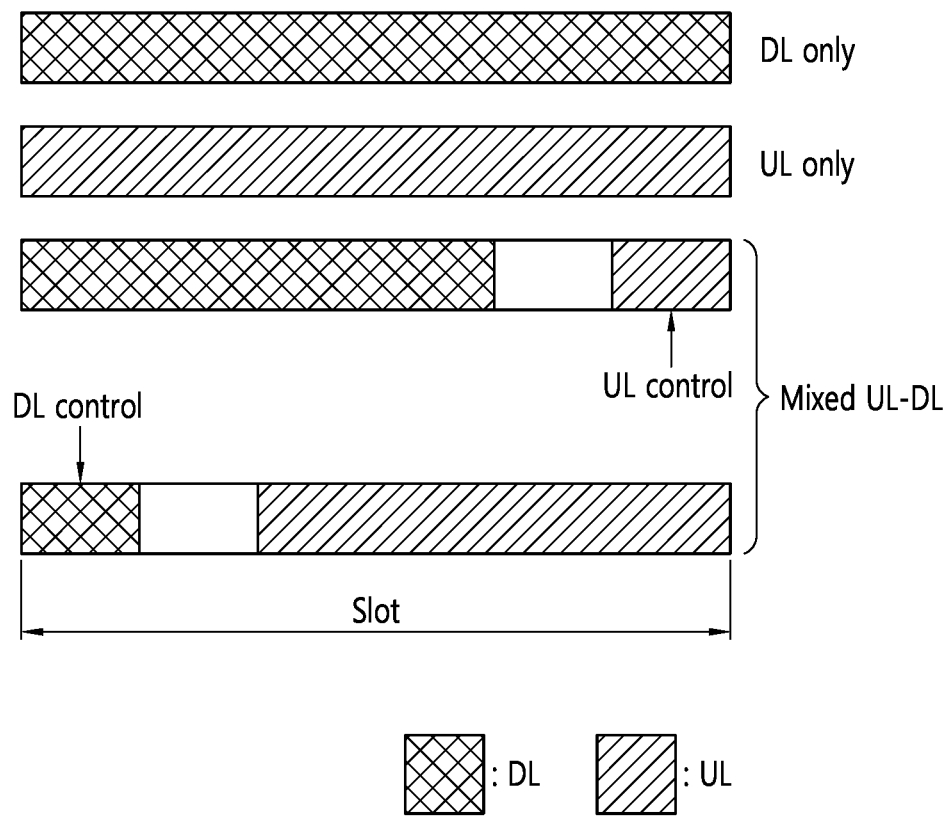
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration
    DL region+Guard period (GP)+UL control region
    DL control region+GP+UL region Here, DL region may be (i) DL data region, (ii) DL control region+DL data region. UL region may be (i) UL data region, (ii) UL data region+UL control region.

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
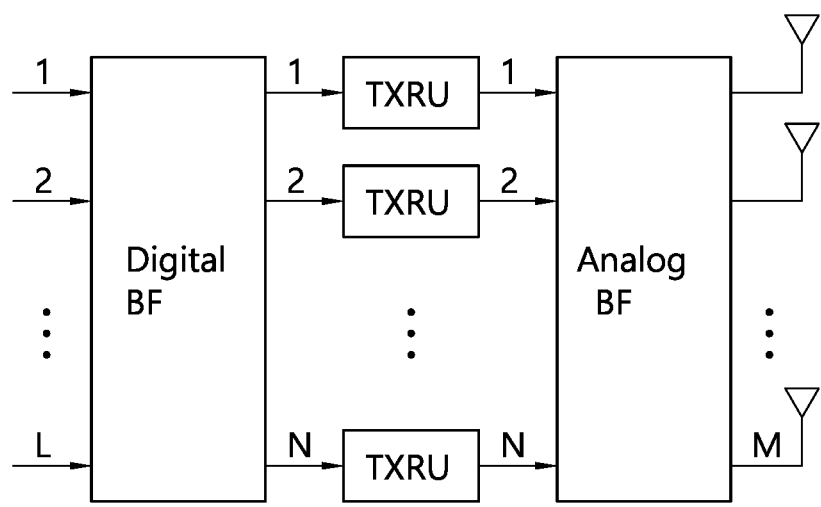
FIG. 12 is an abstract schematic diagram illustrating hybrid beamforming from the viewpoint of TXRUs and physical antennas.

FIG. 12 is an abstract schematic diagram illustrating hybrid beamforming from the viewpoint of TXRUs and physical antennas.

In FIG. 12, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 12, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 13:
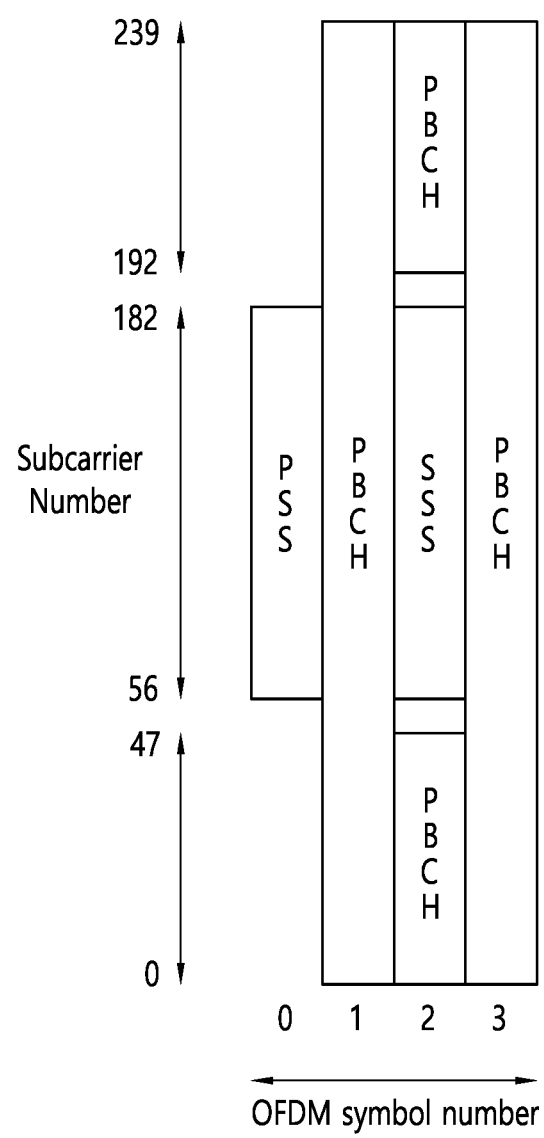
FIG. 13 schematically illustrates a synchronization signal/PBCH (SS/PBCH) block.

FIG. 13 schematically illustrates a synchronization signal/PBCH (SS/PBCH) block.

Referring to FIG. 13, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

Regarding a half frame having SS/PBCH blocks, the indexes of first symbols of candidate SS/PBCH blocks are determined according to the subcarrier spacing of SS/PBCH blocks described blow.

Case A—Subcarrier spacing of 15 kHz: The first symbols of the candidate SS/PBCH blocks have an index represented by $\{2, 8\}+14*n$ where n=0, 1 for a carrier frequency of 3 GHz or less and n=0, 1, 2, 3 for a carrier frequency which is greater than 3 GHz and is less than or equal to 6 GHz.

Case B—Subcarrier spacing of 30 kHz: The first symbols of the candidate SS/PBCH blocks have an index represented by $\{4, 8, 16, 20\}+28*n$ where n=0 for a carrier frequency of 3 GHz or less and n=0, 1 for a carrier frequency which is greater than 3 GHz and is less than or equal to 6 GHz.

Case C—Subcarrier spacing of 30 kHz: The first symbols of the candidate SS/PBCH blocks have an index represented by $\{2, 8\}+14*n$ where n=0, 1 for a carrier frequency of 3 GHz or less and n=0, 1, 2, 3 for a carrier frequency which is greater than 3 GHz and is less than or equal to 6 GHz.

Case D—Subcarrier spacing of 120 kHz: The first symbols of the candidate SS/PBCH blocks have an index represented by $\{4, 8, 16, 20\}+28*n$ where n=0, 1, 2, 3, 5, 6, 7, 8, 10, 11, 12, 13, 15, 16, 17, 18 for a carrier frequency greater than 6 GHz.

Case E—Subcarrier spacing of 240 kHz: The first symbols of the candidate SS/PBCH blocks have an index represented by $\{8, 12, 16, 20, 32, 36, 40, 44\}+56*n$ where n=0, 1, 2, 3, 5, 6, 7, 8 for a carrier frequency greater than 6 GHz.

The candidate SS/PBCH blocks in the half frame are indexed in ascending order from 0 to L−1 on the time axis. The UE needs to determine two LSBs for L=4 of the SS/PBCH block index per half frame and three LSBs for L>4 from one-to-one mapping with the index of a DM-RS sequence transmitted in the PBCH. For L=64, the UE needs to determine three MSBs of the SS/PBCH block index per half frame by PBCH payload bits.

The indexes of SS/PBCH blocks in which the UE cannot receive other signals or channels in REs overlapping with REs corresponding to the SS/PBCH blocks may be set via a higher-layer parameter 'SSB-transmitted-SIB1'. Further, the indexes of SS/PBCH blocks per serving cell in which the UE cannot receive other signals or channels in REs overlapping with REs corresponding to the SS/PBCH blocks may be set via a higher-layer parameter 'SSB-transmitted'. The setting via 'SSB-transmitted' may override the setting via 'SSB-transmitted-SIB1'. The periodicity of a half frame for reception of SS/PBCH blocks per serving cell may be set via a higher-layer parameter 'SSB-periodicityServingCell'. When the UE does not receive the setting of the periodicity of the half frame for the reception of the SS/PBCH blocks, the UE needs to assume the periodicity of the half frame. The UE may assume that the periodicity is the same for all SS/PBCH blocks in a serving cell.

Figure 14:
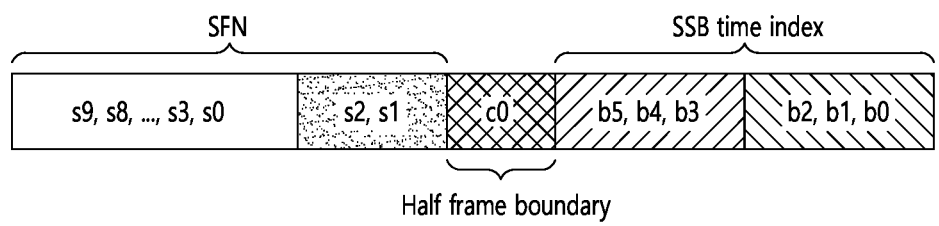
FIG. 14 illustrates a method for a UE to obtain timing information.

FIG. 14 illustrates a method for a UE to obtain timing information.

First, a UE may obtain six-bit SFN information through a master information block (MIB) received in a PBCH. Further, the UE may obtain a four-bit SFN in a PBCH transport block.

Second, the UE may obtain a one-bit half frame indicator as part of a PBCH payload. In less than 3 GHz, the half frame indicator may be implicitly signaled as part of a PBCH DMRS for Lmax=4.

Finally, the UE may obtain an SS/PBCH block index by a DMRS sequence and the PBCH payload. That is, the UE may obtain three bits of LSB of the SS block index by the DMRS sequence for a period of 5 ms. Also, three bits of MSB of timing information are explicitly carried in the PBCH payload (for more than 6 GHz).

In initial cell selection, the UE may assume that a half frame having SS/PBCH blocks occurs with a periodicity of two frames. Upon detecting an SS/PBCH block, when $k_{SSB} \leq 23$ for FR1 and $k_{SSB} \leq 11$ for FR2, the UE determines that a control resource set for a Type0-PDCCH common search space exists. When $k_{SSB} > 23$ for FR1 and $k_{SSB} > 11$ for FR2, the UE determines that there is no control resource set for the Type0-PDCCH common search space.

For a serving cell in which SS/PBCH blocks are not transmitted, the UE obtains time and frequency synchronization of the serving cell based on reception of SS/PBCH blocks on a PCell or PSCell of a cell group for the serving cell.

Hereinafter, acquisition of system information will be described.

System information (SI) is divided into a master information block (MIB) and a plurality of system information blocks (SIBs) where:

the MIB is transmitted always on a BCH according to a period of 80 ms, is repeated within 80 ms, and includes parameters necessary to obtain system information block type1 (SIB1) from a cell;

SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;

SIBs other than SIB1 are carried via system information (SI) messages transmitted on the DL-SCH. Each SI message is transmitted within a time-domain window (referred to as an SI window) periodically occurring;

For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
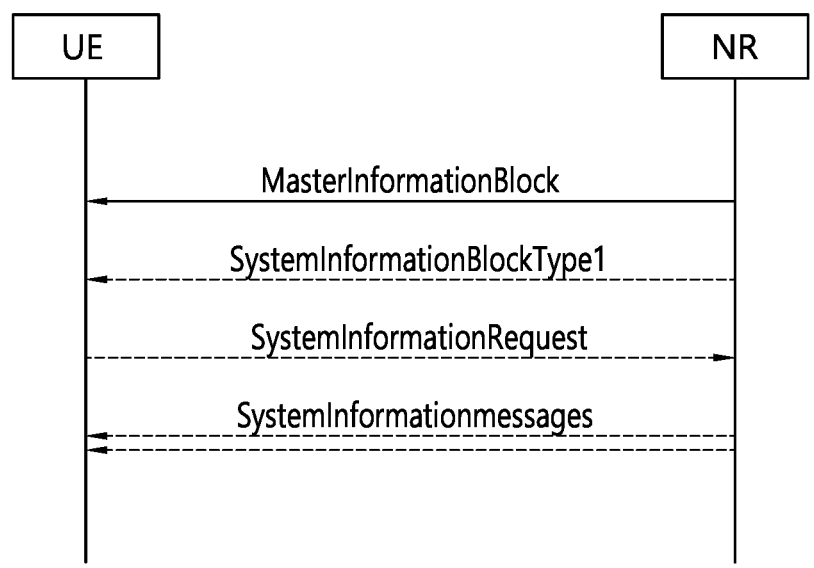
FIG. 15 illustrates an example of a system information acquisition process of a UE.

FIG. 15 illustrates an example of a system information acquisition process of a UE.

Referring to FIG. 15, the UE may receive an MIB from a network and may then receive SIB1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 5.

TABLE 5

| Type of signal | Operation/obtained information |
| --- | --- |
| Step 1 Uplink PRACH preamble | To obtain initial beam<br>Random election of RA-preamble ID |
| Step 2 Random access response on DL-SCH | Timing alignment information<br>RA-preamble ID<br>Initial uplink grant, temporary C-RNTI |
| Step 3 Uplink transmission on UL-SCH | RRC connection request<br>UE identifier |
| Step 4 Downlink contention resolution | C-RNTI on PDCCH for initial access<br>C-RNTI on PDCCH for RRC_CONNECTED UE |

Figure 16:
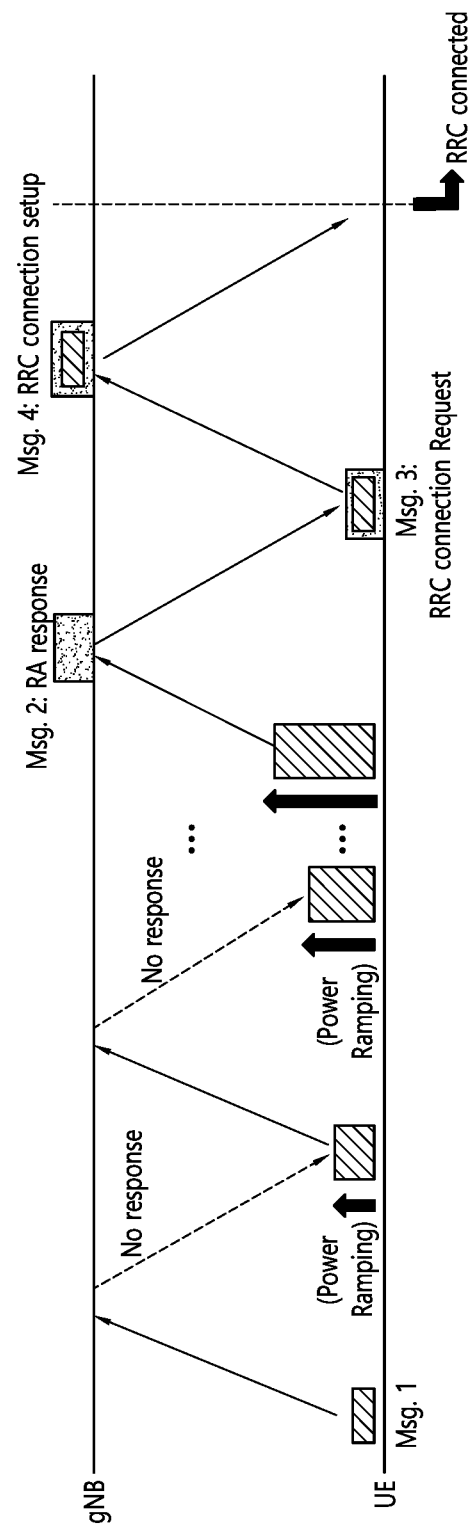
FIG. 16 illustrates a random access procedure.

FIG. 16 illustrates a random access procedure.

Referring to FIG. 16, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 17:
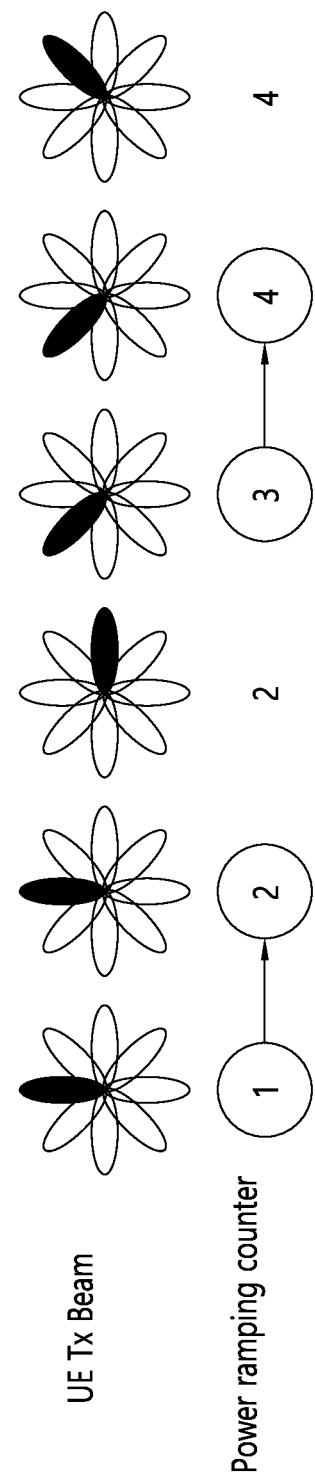
FIG. 17 illustrates a power ramping counter.

FIG. 17 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 17, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 18:
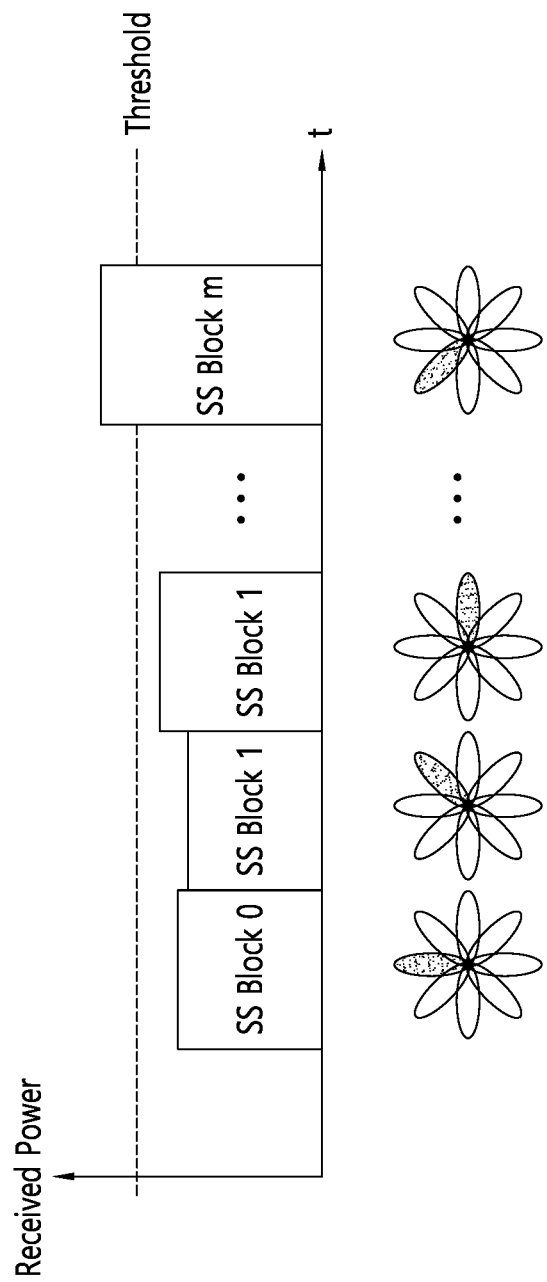
FIG. 18 illustrates the concept of the threshold of an SS block in a relationship with an RACH resource.

FIG. 18 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 18, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Meanwhile, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with (=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DU/UL BWP assumed by the UE is defined as an initial active DU/UL BWP.

<Discontinuous Reception (DRX)>

Discontinuous reception (DRX) refers to an operation mode that enables a UE to reduce battery consumption and to discontinuously receive a downlink channel. That is, the UE configured in DRX may discontinuously receive a DL signal, thereby reducing power consumption.

A DRX operation is performed within a DRX cycle indicating a time period in which an on duration is periodically repeated. The DRX cycle includes an on duration and a sleep duration (or opportunity for DRX). The on duration indicates a time period in which a UE monitors a PDCCH to receive the PDCCH.

DRX may be performed in a radio resource control (RRC)_IDLE state (or mode), RRC_INACTIVE state (or mode), or RRC_CONNECTED state (or mode). In the RRC_IDLE state and the RRC_INACTIVE state, DRX may be used to discontinuously receive a paging signal.

RRC_IDLE state: State in which a wireless connection (RRC connection) is not established between a base station and a UE.

RRC_INACTIVE state: State in which a wireless connection (RRC connection) is established between a base station and a UE but is deactivated.

RRC_CONNECTED state: State in which a radio connection (RRC connection) is established between a base station and a UE.

DRX may be basically divided into idle-mode DRX, connected DRX (C-DRX), and extended DRX.

DRX applied in the idle state may be referred to as idle-mode DRX, and DRX applied in the connected state may be referred to as connected-mode DRX (C-DRX).

Extended/enhanced DRX (eDRX) is a mechanism capable of extending the cycle of idle-mode DRX and C-DRX and may be mainly used for application of (massive) IoT. In idle-mode DRX, whether to allow eDRX may be configured based on system information (e.g., SIB1). SIB1 may include an eDRX-allowed parameter. The eDRX-allowed parameter is a parameter indicating whether idle-mode extended DRX is allowed.

<Idle-Mode DRX>

In the idle mode, a UE may use DRX to reduce power consumption. One paging occasion (PO) is a subframe in which a paging-radio network temporary identifier (P-RNTI) can be transmitted through a physical downlink control channel (PDCCH), a MTC PDCCH (MPDCCH), or a narrowband PDCCH (NPDCCH) (addressing a paging message for NB-IoT).

In a P-RNTI transmitted through an MPDCCH, PO may indicate a starting subframe of an MPDCCH repetition. In the case of a P-RNTI transmitted through an NPDCCH, when a subframe determined based on a PO is not a valid NB-IoT downlink subframe, the PO may indicate a starting subframe of an NPDCCH repetition. Therefore, a first valid NB-IoT downlink subframe after the PO is the starting subframe of the NPDCCH repetition.

One paging frame (PF) is one radio frame that may include one or a plurality of paging occasions. When DRX is used, the UE needs to monitor only one PO per DRX cycle. One paging narrow band (PNB) is one narrow band in which the UE receives a paging message. A PF, a PO and a PNB may be determined based on DRX parameters provided via system information.

Figure 19:
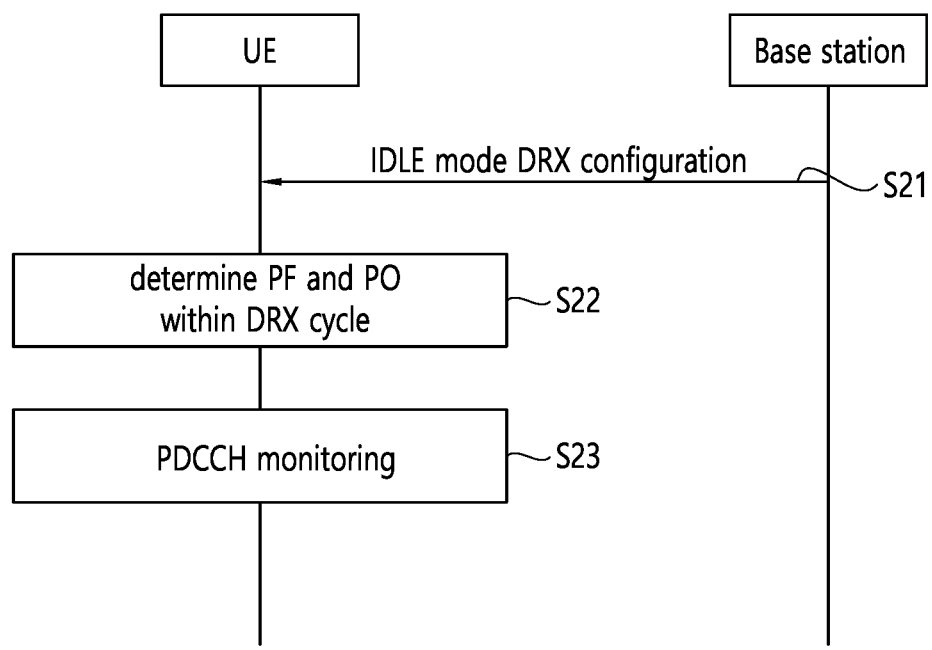
FIG. 19 is a flowchart illustrating an example of performing an idle-mode DRX operation.

FIG. 19 is a flowchart illustrating an example of performing an idle-mode DRX operation.

Referring to FIG. 19, a UE may receive idle-mode DRX configuration information from a base station through higher-layer signaling (e.g., system information) (S21).

The UE may determine a paging frame (PF) and a paging occasion (PO) to monitor a PDCCH in a paging DRX cycle based on the idle-mode DRX configuration information (S22). In this case, the DRX cycle may include an on duration and a sleep duration (or opportunity for DRX).

The UE may monitor a PDCCH in the PO of the determined PF (S23). Here, for example, the UE monitors only one subframe (PO) per paging DRX cycle. In addition, when the UE receives a PDCCH scrambled with a P-RNTI in the on duration (that is, when paging is detected), the UE may transition to a connected mode and may transmit and receive data to and from the base station.

<Connected-Mode DRX (C-DRX)>

C-DRX refers to DRX applied in the RRC connected state. The DRX cycle of C-DRX may include a short DRX cycle and/or a long DRX cycle. Here, the short DRX cycle may be optional.

When C-DRX is configured, a UE may perform PDCCH monitoring for an on duration. When a PDCCH is successfully detected during the PDCCH monitoring, the UE may operate (or run) an inactivity timer and may maintain an awake state. However, when the PDCCH is not successfully detected during the PDCCH monitoring, the UE may enter a sleep state after the on duration expires.

When C-DRX is configured, a PDCCH reception occasion (e.g., a slot having a PDCCH search space) may be discontinuously configured based on the C-DRX configuration. However, when C-DRX is not configured, a PDCCH reception occasion (e.g., a slot having a PDCCH search space) can be continuously configured in the present disclosure.

PDCCH monitoring may be limited to a time period set as a measurement gap regardless of a C-DRX configuration.

Figure 20:
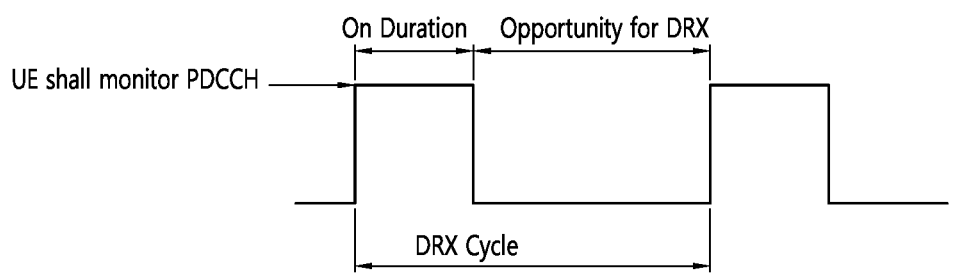
FIG. 20 illustrates a DRX cycle.

FIG. 20 illustrates a DRX cycle.

Referring to FIG. 20, the DRX cycle includes an 'on duration (hereinafter, also referred to as a 'DRX-on duration') and an 'opportunity for DRX'. The DRX cycle defines a time interval in which the on-duration is cyclically repeated. The on-duration indicates a time duration in which a UE performs monitoring to receive a PDCCH. If DRX is configured, the UE performs PDCCH monitoring during the 'on-duration'. If there is a PDCCH successfully detected during the PDCCH monitoring, the UE operates an inactivity timer and maintains an awake state. On the other hand, if there is no PDCCH successfully detected during the PDCCH monitoring, the UE enters a sleep state after the 'on-duration' ends. Therefore, when the DRX is configured, in the performing of the procedure and/or methods described/proposed above, PDCCH monitoring/reception may be performed discontinuously in a time domain. For example, when the DRX is configured, in the present disclosure, a PDCCH reception occasion (e.g., a slot having a PDCCH search space) may be configured discontinuously according to the DRX configuration. Otherwise, if the DRX is not configured, in the performing of the procedure and/or methods described/proposed above, PDCCH monitoring/reception may be performed continuously in the time domain. For example, when the DRX is not configured, in the present disclosure, a PDCCH reception occasion (e.g., a slot having a PDCCH search space) may be configured continuously. Meanwhile, regardless of whether the DRX is configured, PDCCH monitoring may be restricted in a duration configured as a measurement gap.

Table 6 shows a UE procedure related to DRX (RRC_CONNECTED state). Referring to Table 6, DRX configuration information may be received through higher layer (e.g., RRC) signaling. Whether DRX is ON or OFF may be controlled by a DRX command of a MAC layer. If the DRX is configured, PDCCH monitoring may be performed discontinuously.

TABLE 6

| | Type of signals | UE procedure |
|---|---|---|
| 1st step | RRC signalling (MAC-CellGroupConfig) | Receive DRX configuration information |
| 2nd step | MAC CE ((Long) DRX command MAC CE) | Receive DRX command |
| 3rd step | — | Monitor a PDCCH during an on-duration of a DRX cycle |

MAC-CellGroupConfig may include configuration information required to configure a medium access control (MAC) parameter for a cell group. MAC-CellGroupConfig may also include configuration information regarding DRX. For example, MAC-CellGroupConfig may include information for defining DRX as follows.

Value of drx-OnDurationTimer: This defines a length of a starting duration of a DRX cycle. It may be a timer related to a DRX-on duration.

Value of drx-InactivityTimer: This defines a length of a time duration in which the UE is in an awake state, after a PDCCH occasion in which a PDCCH indicating initial UL or DL data is detected.

Value of drx-HARQ-RTT-TimerDL: This defines a length of a maximum time duration until DL retransmission is received, after DL initial transmission is received.

Value of drx-HARQ-RTT-TimerDL: This defines a length of a maximum time duration until a grant for UL retransmission is received, after a grant for UL initial transmission is received.

drx-LongCycleStartOffset: This defines a time length and a starting point of a DRX cycle drx-ShortCycle (optional): This defines a time length of a short DRX cycle.

Herein, if any one of drx-OnDurationTimer, drx-InactivityTimer, drx-HARQ-RTT-TimerDL, and drx-HARQ-RT-TimerDL is operating, the UE performs PDCCH monitoring in every PDCCH occasion while maintaining an awake state.

Hereinafter, proposals of the disclosure are described.

Configurations, operations and other features of the present disclosure will be understood by the embodiments of the present disclosure described with reference to the attached figures.

A wake-up signal (WUS) has been proposed as a method for reducing power consumption in PDCCH monitoring. Here, a UE which receives the wake-up signal performs PDCCH monitoring and a UE which does not receive the wake-up signal maintains a sleep mode and may reduce the power consumption. However, in the wake-up signal-based power saving scheme, when the wake-up signal monitoring period is short, power saving gain is reduced. Also, when the wake-up signal monitoring period is long, the power saving gain is increased, but a loss of throughput increases due to increase of latency. Accordingly, the present disclosure solves these shortcomings and proposes a more adaptive power saving schemes.

First, hereinafter, a configurability of the wake-up signal monitoring period will be described.

The present disclosure suggests that a wake-up signal monitoring period is configured by a network based on a data transmission/reception pattern and/or assistance information (for example, a service type (e.g., gaming, streaming, etc.), speed, detected cell information, etc.) from a UE.

Figure 21:
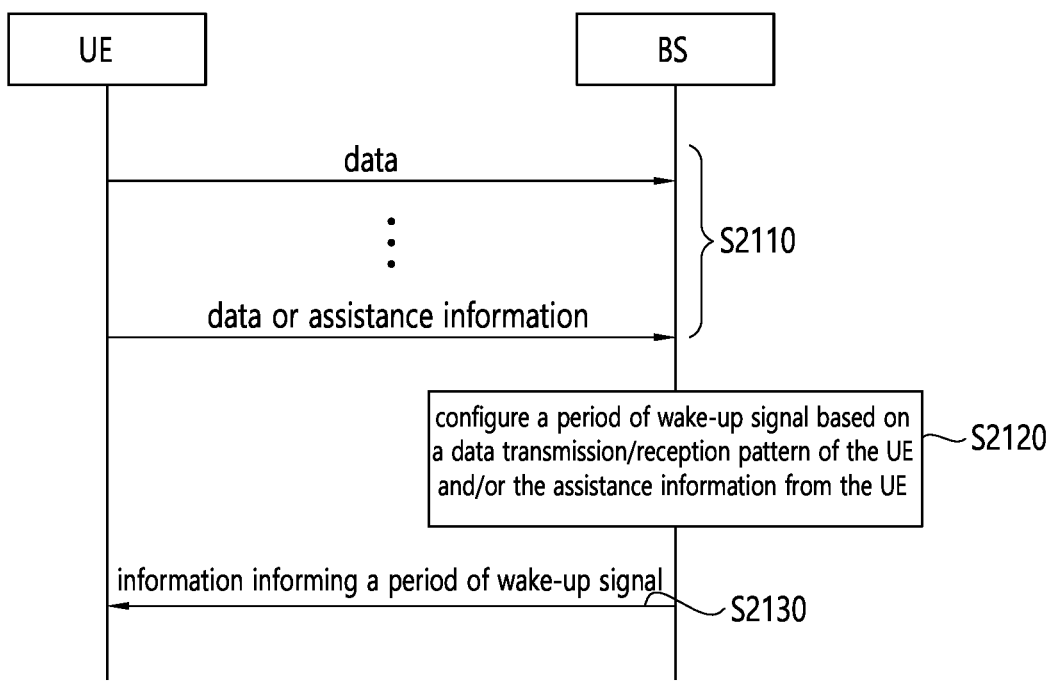
FIG. 21 is a flowchart of an example of configuring a wake-up signal monitoring period according to some implementations of the present disclosure.

FIG. 21 is a flowchart of an example of configuring a wake-up signal monitoring period according to some implementations of the present disclosure.

Referring to FIG. 21, a UE transmits data and/or assistance information to abase station (S2110).

The base station configures a period of wake-up signal based on a data transmission/reception pattern of the UE and/or the assistance information from the UE (S2120).

The base station transmits information informing the period of wake-up signal to the UE (S2130). The information may be transmitted through a RRC signal or DCI.

Herein, for example, a short wake-up signal monitoring period may be configured for a UE that frequently receives burst data in order to reduce latency, and a long wake-up signal monitoring period may be configured for a UE with a low frequency of data to transmission/reception in order to increase power saving gain. Also, when the data transmission/reception pattern of the UE changes, the network may configure a new wake-up signal monitoring period based on the changed data transmission/reception pattern.

Also, for example, in order to configure the wake-up signal monitoring period, a plurality of candidate periodicities may be predefined or may be indicated to the UE through higher layer signal or the like. Thereafter, the network informs a corresponding UE of a specific wake-up signal monitoring period based on power consumption related information (e.g., traffic information, etc.) of a specific UE through higher layer signaling (e.g., RRC message) or layer-1 (L1) signaling DCI such as DCI or the like.

Also, a wake-up signal transmission may be performed by including information on a subsequent wake-up signal monitoring period in the wake-up signal. In other words, when the wake-up signal is detected by the UE monitoring the wake-up signal, the UE may acquire configuration information related to wake-up signal monitoring to be performed later. Here, the UE receiving the corresponding wake-up signal may then change the wake-up signal monitoring period to perform the wake-up signal monitoring.

Additionally, the wake-up signal monitoring period may be independently configured per bandwidth part (BWP) and/or carrier. Through this, efficient scheduling may be performed, and specifically, effective power saving may be realized when a target service is configured differently for each BWP or carrier. For example, the UE may be configured to perform monitoring for the wake-up signal only in the primary cell and not perform monitoring for the wake-up signal in the secondary cell. Alternatively, each of BWPs is preconfigured to have a different wake-up signal monitoring period, and the UE may adjust the wake-up signal monitoring period through BWP switching.

For example, a first BWP with wake-up signal monitoring period set to a first period and a second BWP with wake-up signal monitoring period set to a second period may be configured by the network. Here, the first period and the second period may have different values. In this case, a BWP in which the UE operates may be changed through an indication of the network, and accordingly, the wake-up signal monitoring period of the UE may also be changed.

When a UE performs monitoring of the wake-up signal and the wake-up signal is not detected, a method in which the UE does not perform monitoring for all search space sets configured for the UE may be considered. Conversely, in addition, in NR a plurality of search space sets (SS sets) may be configured for monitoring different radio network temporary identifiers (RNTIs) or for various diversity effects, and the present disclosure proposes to perform wake-up signal monitoring for each search space set for more adaptive power saving. In other words, a search space set-specific wake-up signal informing a wake-up operation for a specific search space set may be transmitted. Specifically, when a UE detects a search space set-specific wake-up signal, the UE may perform monitoring for a specific search space set corresponding to the search space set-specific wake-up signal, and may not perform monitoring for other search space sets.

In this case, the wake-up signal monitoring period may also be configured and updated for each search space set. For example, relatively long wake-up signal monitoring period may be configured for a search space set for monitoring fallback DCI, and relatively short wake-up signal monitoring period may be configured for a search space set for monitoring non-fallback DCI.

For example, since data may be transmitted relatively frequently in a search space set for monitoring a plurality of RNTIs, relatively short wake-up signal monitoring period may be configured for the search space set. Here, sizes of DCIs having different RNTIs may be identical. Also, relatively long wake-up signal monitoring period may be configured for a search space set in which monitoring for a single RNTI is performed.

Hereinafter, a power saving signal for PDCCH monitoring adaptation will be described.

Specifically, the present disclosure proposes a power saving signal (PwsS) for dynamic change of configurations (e.g., monitored DCI, a CORESET, a search space set, a monitoring period, etc.) of PDCCH monitoring. Here, for example, the power saving signal may include a function of a wake-up signal. That is, the wake up signal may operate in the same manner as suggested below. Options of each content to be described below may be implemented alone or in combination.

Also, it may be assumed that the PDCCH monitoring configuration set by the power saving signal is applied after a specific time from the reception of the power saving signal. This is for a common understanding between the UE and the network.

Here, for example, if a feedback as ACK/NACK for the power saving signal is transmitted, the specific time may be a time from the reception of the power saving signal until corresponding feedback is transmitted to the network.

Also, for example, when a configuration change request time of each UE is defined by UE capability, etc., a time of applying the configuration change by the power saving signal may be applied differently according to each UE capability. For example, information on the configuration change request time of the UE may be included in the UE capability information transmitted by the UE, and the power saving signal may include information on the specific time determined based on the information on the configuration change request time. Thereafter, the UE may acquire information on the specific time through the power saving signal.

Also, for example, the application time of the corresponding configuration change may be determined by numerology and PDCCH decoding capability of the UE. For example, numerology-based specific time may be predefined, and the specific time based on the PDCCH decoding capability of the UE may be UE-specifically configured through the UE capability information as described above.

The power saving signal may indicate a configuration related to PDCCH monitoring, and may be configured in the form of DCI or sequence. For example, DCI-based power saving signal may have robustness against a malfunction such as a false alarm or the like through a cyclic redundancy check (CRC), and has an advantage of being able to apply various configurations through an information bit, etc.

Also, sequence-based power saving signal has an advantage of simple detection. In the case of a method of performing configured existing DCI monitoring when the power saving signal is detected while only performing monitoring the power saving signal among the suggestions below, the monitoring period for the power saving signal may be predefined or additionally indicated. Also, the configurable wake-up signal monitoring period among the above suggestions may be equally applied to the power saving signal monitoring period. Here, the configurable wake-up signal monitoring period may include a search space set-specific wake-up signal monitoring period.

Figure 22:
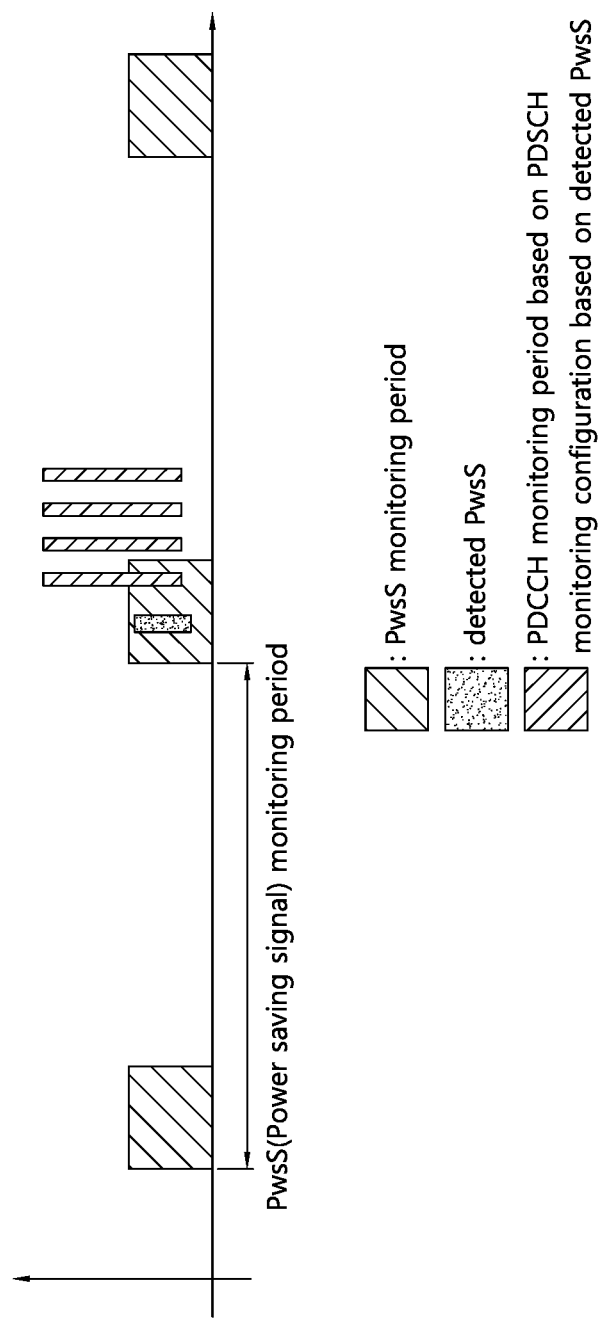
FIG. 22 describes an example of a PDCCH monitoring operation of a UE in case the power saving signal is introduced.

FIG. 22 describes an example of a PDCCH monitoring operation of a UE in case the power saving signal is introduced.

Referring to FIG. 22, for example, in case a power saving signal monitoring period is 100 millisecond (ms), only the monitoring for the power saving signal is performed at the beginning of each period. After the detection of the power saving signal, monitoring may be performed according to a PDCCH monitoring configuration set by the power saving signal, and when the next period starts, only the monitoring for the power saving signal may be performed again.

Also, for example, when DRX operation is configured, only the power saving signal monitoring may be performed at a predetermined location before an on-duration period starts or within the on-duration period, and after the detection of the power saving signal, PDCCH monitoring may be performed (during the active time of DRX operation) according to the PDCCH monitoring configuration set by the power saving signal, and only the monitoring for the power saving signal may be performed again at a predetermined position before the start of the next on-duration period or within the on-duration period.

Hereinafter, examples of implementation of a power saving signal will be described. Meanwhile, hereinafter, an existing DCI may mean a DCI defined in NR excluding DCI for power saving purposes (e.g., power saving signal). For example, the existing DCI may be DCI to which RNTI such as SI (system information)-RNTI, P (paging)-RNTI, RA (random access)-RNTI, SFI (slot format indication)-RNTI, INT (interruption)-RNTI, TPC (transmit power control)-PUSCH-RNTI, TPC-PUCCH-RNTI, TPC-SRS (sounding reference signal)-RNTI, C (cell)-RNTI, MCS (modulation coding scheme)-C-RNTI, CS (configured scheduling)-RNTI, etc. can be applied.

The following options are specific examples of a form in which the power saving signal proposed in the present disclosure is implemented.

(Option 1-1) new DCI

A new DCI format may be defined (e.g., DCI format 2_6, etc.) for the power saving signal which may be referred to as power saving-DCI (PS-DCI). Or, for example, a new RNTI having the same size as the existing DCI may be defined. Here, this may be referred to as a power saving-RNTI (PS-RNTI).

The new DCI format may indicate to monitor the existing DCI by applying one or more among two or more PDCCH monitoring configurations. Alternatively, one or more PDCCH monitoring configurations may indicate to stop monitoring of the existing DCI. Here, the PDCCH monitoring configuration may mean each parameter or a combination of parameters required for the PDCCH monitoring. For example, the PDCCH monitoring configuration is a combination of some or all of a BWP index, a CORESET index, a search space set index, monitored DCI, a monitoring period, a monitoring pattern, a monitored aggregation level (AL) and the number of candidates for each AL.

For the new DCI or PS-DCI, a CORESET/search space set for monitoring the DCI may be independently configured. As described above, this may be to reduce power consumed in monitoring the power saving signal. Additionally, since blind decoding for various ALs may increase power consumption, it may be preferable that an operation for only performing blind decoding for a specific number of candidates (e.g., two candidates for AL8) for a specific AL is predefined.

As another method, the new DCI may be defined in the same size as a specific DCI format (e.g., fallback DCI 1_0) among existing DCI formats. In this case, the UE may reuse CORESET/search space set for associated existing DCI format for the purpose of power saving signal monitoring, and may determine whether the new DCI exists only by detecting the new RNTI (e.g., PS-RNTI) without the need to perform additional blind decoding.

Additionally, the existing DCI format having the same DCI size as the new DCI may be predefined (e.g., fallback DCI), or the network may indicate a DCI format (for CORESET for power saving signal monitoring/search space set and/or for equalizing the size of the power saving signal) to the UE through higher layer signaling or the like.

In this case, an operation of only monitoring an existing DCI having the same DCI format size as a new DCI among existing DCIs configured to perform monitoring may be predefined or may be indicated by the network. This may mean that the PDCCH monitoring configuration is performed after reception of the power saving signal by the power saving signal or the new DCI.

When this is applied, even if the detection of the power saving signal fails, since the existing DCI is monitored, there is an advantage in that it is possible to reduce the performance impact caused by the failure to receive the power saving signal. For example, when the DRX operation is applied, the UE may perform monitoring for the power saving signal and the existing DCI having the same DCI format size as the power saving signal in the on-duration period on the same CORESET/search space set, and the UE that detected the power saving signal during the monitoring process may apply the PDCCH monitoring configuration indicated by the power saving signal to subsequent PDCCH monitoring. When the DRX operation is not applied, by configuring the power saving signal monitoring period and duration and the like, monitoring for the power saving signal and the existing DCI having the same DCI format size as the power saving signal may be performed in the corresponding area.

Meanwhile, the new DCI may include an existing DCI to which a new field is added and an existing DCI indicating the PDCCH monitoring configuration using a reserved field. For example, a plurality of PDCCH monitoring configuration sets may be defined through pre-definition or by indication of network, and a PDCCH monitoring configuration index to be applied later may be indicated by a new field related to power saving of the new DCI, and conventional downlink/uplink scheduling may be performed by the existing field.

As another method, a 1-bit indicator may be added to the power saving-related DCI to indicate whether the corresponding DCI is used to indicate the PDCCH monitoring configuration for power saving purpose or whether the corresponding DCI operates as an existing DCI. The UE may differently interpret of each bit field according to the decoding result of the corresponding indication field.

(Option 1-2) Treat an existing DCI as a power saving signal

As another method of transmitting the power saving signal, the power saving signal may be transmitted/received without defining additional DCI formats by using the existing DCI as the power saving signal. This may mean that the existing DCI designated as the power saving signal (or whether the existing DCI is transmitted) determines the PDCCH monitoring configuration after reception of the corresponding DCI.

In other words, the existing DCI designated as the power saving signal (or whether the existing DCI is transmitted) may indicate to monitor the existing DCI by applying one or more of two or more PDCCH monitoring configurations. Alternatively, one or more PDCCH monitoring configurations may indicate to stop the existing DCI monitoring. For example, a fallback DCI may be used as the power saving signal by an indication of the network or pre-definition, and a UE receiving the fallback DCI may apply a predefined PDCCH monitoring configuration or a PDCCH monitoring configuration indicated by the network after receiving the fallback DCI.

For example, before the fallback DCI is received, monitoring may be performed only for the CORESET/search space set for which the fallback DCI is monitored, and after the fallback DCI is received, monitoring for all the configured CORESET/search space sets may be performed. Alternatively, for example, before receiving the fallback DCI, monitoring may be performed by applying a value twice the configured monitoring period, and after receiving the fallback DCI, monitoring may be performed by applying the configured monitoring period.

For more adaptive power saving, the present disclosure may be extended to perform monitoring for a plurality of existing DCIs, and herein, each of the existing DCIs may mean a different PDCCH monitoring configuration. For example, by pre-definition or an indication of the network, the UE may monitor fallback DCI 1_0 and non-fallback DCI 1_1, and herein, the fallback DCI may indicate a relaxed monitoring configuration and the non-fallback DCI may indicate a normal monitoring configuration. Also, DCI that cannot be considered as the power saving signal among existing DCIs may be predefined or indicated by the network. For example, the UE may not change the PDCCH monitoring configuration when the UE detects DCI for the purpose of broadcast.

(Option 1-3) a power saving signal in the form of a sequence.

The power saving signal in the form of a sequence may indicate monitoring configuration using sequence parameters and/or scrambling parameters. In this case, the UE may perform correlation by applying each parameter, and may apply a monitoring configuration related to the detected parameter after the detection.

In other words, a sequence parameter and/or a scrambling parameter of the power saving signal sequence may indicate to monitor the existing DCI by applying one or more of two or more PDCCH monitoring configurations. Alternatively, one or more PDCCH monitoring configurations may be used to indicate to stop monitoring of the existing DCI.

Hereinafter, PDCCH monitoring configuration will be described.

The PDCCH monitoring configuration indicated by the power saving signal proposed above may include the following contents. Some or all contents may be indicated by the power saving signal. That is, the PDCCH monitoring configuration may be changed by some of all contents included in the power saving signal. Here, for example, in the case of the aforementioned option 1 (a new DCI), some or a combination of the following contents may be defined as DCI contents.

(Content 1) BWP Indication

As a method of power saving, it may be desirable to perform power saving signal monitoring in a relatively small bandwidth part and perform actual PDCCH/PDSCH reception in a wider bandwidth part. In this case, the power saving signal may include an indication of a bandwidth part for performing PDCCH monitoring after receiving the power saving signal. For example, when the UE detects a power saving signal, PDCCH monitoring may be performed in the bandwidth part indicated by the power saving signal. Alternatively, it may be assumed that PDCCH monitoring after receiving the power saving signal is performed in a pre-defined bandwidth part or a pre-indicated bandwidth part (e.g., active BWP).

(Content 2) Activation/De-Activation of Search Space Set (and/or Activation/De-Activation of CORESET)

In the PDCCH monitoring step, the power saving signal may indicate a search space set to be actually monitored among the search space sets configured by the UE for additional power saving. For example, if data to be transmitted to a specific UE may be scheduled by a search space set #X, since monitoring of a search space set #Y and a search space set #Z cause unnecessary power consumption, performing monitoring only for the search space set #X may be indicated through the power saving signal. Meanwhile, the same can be applied to CORESET. For example, when it is indicated not to perform monitoring of CORESET #X through the power saving signal, the UE may not perform monitoring of one or more search space sets associated with the CORESET #X.

(Content 3) Timing of Applying Configuration Change

An actual application timing for a change of a PDCCH monitoring configuration indicated by the power saving signal may be indicated. To apply the change of the configuration immediately after receiving the power saving signal, a frequency of the power saving signal monitoring must be increased, which means that the power saving gain is reduced. Therefore, it may be desirable to indicate the time of application of the configuration change. Here, for example, the application time of the configuration change may be a specific time after receiving the power saving signal, may be determined based on UE capability, or may be defined for each numerology. Specific examples thereof are the same as described above, and thus duplicate explanations are omitted.

(Content 4) Power Saving Signal Configuration

Defining a power saving signal monitoring period, etc. irrespective of the reception data pattern of the UE may cause side effects such as latency increase. Therefore, it may be desirable to include the power saving signal monitoring configuration to be applied later in the power saving signal. Here, for example, the power saving signal monitoring configuration may include a monitoring period, a duration, a monitoring pattern, an indication of a bandwidth part in which the monitoring is performed, and the like.

(Content 5) Search Space Set Configuration

Each or a combination of a monitoring period, a monitoring pattern, a duration, an aggregation level (AL), the number of candidates, monitored DCI, etc. included in the search space set configuration may be changed by the power saving signal. This may mean changing configurations for all of the configured search space sets, or changing a configuration for each search space set in connection with the above-described (Content 2). For example, the configuration of (Content 5) may be applied to the search space set indicated by the power saving signal.

Hereinafter, scheduling of narrowband (NB) CORESET and wideband (WB) CORESET will be described.

In order to reduce power consumption of PDCCH monitoring, a method in which PDCCH monitoring is performed in a narrowband CORESET and PDSCH detected in the corresponding CORESET is scheduled in a wideband is proposed. This may mean that power consumption is reduced by using a narrowband radio frequency (RF) filter or the like in CORESET monitoring and a wideband RF filter is used in PDSCH decoding. In this case, a UE receiving the narrowband CORESET and the wideband PDSCH may assume that there is no additional reception operation in frequency resources other than the CORESET bandwidth or a specific bandwidth including the CORESET bandwidth where the CORESET is positioned when the UE performs CORESET monitoring. This may mean that a reception operation of a preconfigured reference signal (e.g., PDCCH/PDSCH demodulation reference signal (DMRS), CSI-RS (channel state information-reference signal), TRS (tracking reference signal)) is not performed, or that there is no resource allocation for PDSCH in the corresponding frequency resource. That is, the UE may perform a downlink reception only in the bandwidth corresponding to the corresponding CORESET before detecting a command for scheduling PDSCH larger than the CORESET bandwidth or before detecting other wideband indication.

Meanwhile, when the above-described power saving signal configuration is applied to the wake-up signal, the following operation may be performed.

First, the wake-up signal related CORESET/search space set may be configured as follows.

(Option 2-1) wake-up signal-specific CORESET/search space set

With respect to (Option 2-1), a low-power configuration (e.g., small bandwidth, etc.) is possible since the CORESET/search space set is only for the wake-up signal.

With respect to (Option 2-1), the wake-up configuration related CORESET/search space set may be independently configured of the PDCCH monitoring related CORESET/search space set. That is, a PDCCH-based power saving signal-dedicated search space set may be configured to the UE. Here, the configuration may be UE-specific. For example, monitoring for DCI related to a wake-up signal and monitoring for other DCIs may not be performed at the same time. Here, the wake-up signal related CORESET/search space set may not be limited by the CORESET/search space set limit for each bandwidth part.

With respect to (Option 2-1), when the DRX operation is applied, the wake-up signal related CORESET/search space set may be activated in the on-duration period, and may be deactivated simultaneously with the detection of the wake-up signal. Here, the UE may perform monitoring again on the wake-up signal related CORESET/search space set in the next on-duration period. Alternatively, the wake-up signal related CORESET/search space set may be activated in a period other than the on-duration period.

With respect to (Option 2-1) when the DRX operation is not configured, a period for starting of wake-up signal monitoring and a period for monitoring the wake-up signal may be configured. Here, when the wake-up signal is detected in the wake-up signal monitoring process, the wake-up signal monitoring may be stopped until the next wake-up signal monitoring start time. Also, when monitoring the wake-up signal related CORESET/search space set, filtering may be possible only for the corresponding CORESET bandwidth. This may be for low power consumption.

(Option 2-2) CORESET/search space set shared with other DCIs

With respect to (Option 2-2), the UE may wake-up when the wake-up signal related DCI or one of existing DCIs is detected. That is, even without considering the implementation of a wake-up signal, the UE may wake-up through DCI detection based on (Option 2-2).

With respect to (Option 2-2), the network may designate a CORESET/search space set for performing wake-up signal monitoring among existing CORESETs/search space sets and may designate a period, duration, etc. for wake-up signal monitoring. Here, the UE may perform wake-up signal monitoring at a monitoring occasion of a search space set performing wake-up signal monitoring within the corresponding duration.

With respect to (Option 2-2), the following alternatives may be applied.

(Alternative 1) When the existing CORESET/search space set is used for the purpose of transmitting a wake-up signal, the CORESET/search space set may be used only for performing wake-up signal monitoring before detecting the wake-up signal, and target DCI may be monitored after the wake-up signal is detected.

(Alternative 2) When any one of the wake-up signal related DCI or the existing DCI is detected, the UE may wake-up. Here, the size of the wake-up signal related DCI and the size of the existing DCI may be configured to be same, and each of the wake-up signal related DCI and the existing DCI may be distinguished by an RNTI or the like.

(Option 2-3) Existing DCI may be used for a wake-up signal.

With respect to (Option 2-3), a specific DCI may be used for the wake-up signal.

With respect to (Option 2-3), the UE may preferentially monitor only the CORESET/search space set associated with the corresponding DCI within the on-duration period. Here, when the corresponding DCI is detected, monitoring for other configured search space sets may be performed.

Meanwhile, when the wake-up signal related DCI is detected, the UE may operate as follows.

(Option 3-1) The UE may perform monitoring for all configured search space sets.

(Option 3-2) A search space set to be monitored may be indicated by a wake-up signal related DCI. Here, the wake-up signal related DCI may indicate activation/deactivation for each search space set. Here, even after detecting the wake-up signal, the UE may perform monitoring for the wake-up signal.

Hereinafter, a relation between an assistance reference signal and a wake-up signal/power saving signal will be described.

As described above, from the viewpoint of PDCCH monitoring, power saving can be realized by reducing unnecessary decoding operations and increasing sleep time. However, if the sleep time increases during this process, an adjustment process such as automatic gain control (AGC) and time/frequency alignment may be required. In addition, in the process of changing a bandwidth part, activating a secondary cell (SCell), etc., it may be effective in terms of power saving to perform an operation in a new bandwidth part/secondary cell quickly. The assistance reference signal may be considered for this process and the like. The UE may perform processes such as AGC and time/frequency adjustment using the assistance reference signal, and may implement faster bandwidth part change, activation of the secondary cell by performing CSI/RRM (radio resource management) measurement for a new frequency domain in advance.

It may be preferable to use a configured reference signal such as the existing CSI-RS, TRS, etc. as the assistance reference signal, but when the assistance reference signal and the monitoring occasion of the wake-up signal/power saving signal are not adjusted, power saving gain may decrease since the number of wake-ups of the UE increases.

In order to solve this problem, the present disclosure proposes to define the relationship between the assistance reference signal and the monitoring occasion of the wake-up signal/power saving signal as follows. One of the options below may be predefined, or the network may indicate a UE to use a specific option. Also, in the proposals below, an offset may be configured to zero, which may mean that a wake-up signal/power saving signal and an assistance reference signal can be mapped in the same slot or symbol. In addition, the following proposals may be commonly applied to a specific signal or a wake-up signal for a specific RNTI. For example, an IDLE mode UE may monitor a paging signal, and may notify whether monitoring of the corresponding paging signal is performed through additional wake-up signal. Here, the following proposals may be applied.

(Option 4-1) Monitoring occasion of Wake-up signal/power saving signal=Configured reference signal+offset The network may indicate information on monitoring occasion of wake-up signal/power saving signal to each UE for monitoring the wake-up signal/power saving signal of the corresponding UE. For example, the network may indicate the monitoring occasion of the wake-up signal/power saving signal by using a previously configured reference signal index (e.g., CSI-RS/TRS index) and an offset. Here, in addition to the previously configured reference signal, it is also possible to indicate a reference signal configuration for assistance and an offset. When performing monitoring the wake-up signal/power saving signal, the UE receiving the information may assume a position of the monitoring occasion of the wake-up signal/power saving signal based on the information, and may perform a detection of the wake-up signal/power saving signal.

Additionally, since the assistance reference signal may not be required for every wake-up signal/power saving signal monitoring occasion, the UE may assume that this proposal is valid only for the first monitoring occasion when the UE maintains sleep longer than a predetermined specific time or a specific time configured by the network.

(Option 4-2) Configured reference signal=Monitoring occasion of wake-up signal/power saving signal+offset Unlike (Option 4-1), the position of the assistance reference signal may be derived using the offset and the monitoring occasion of the wake-up signal/power saving signal. To this end, the network may indicate the offset and the monitoring occasion of the wake-up signal/power saving signal, and the UE may detect the assistance reference signal based on corresponding information.

As with (Option 4-1), since the assistance reference signal may not be needed for every monitoring occasion of the wake-up signal/power saving signal, the UE may assume that this proposal is valid only for the first monitoring occasion when the UE maintains sleep longer than a predetermined specific time or a specific time configured by the network.

Figure 23:
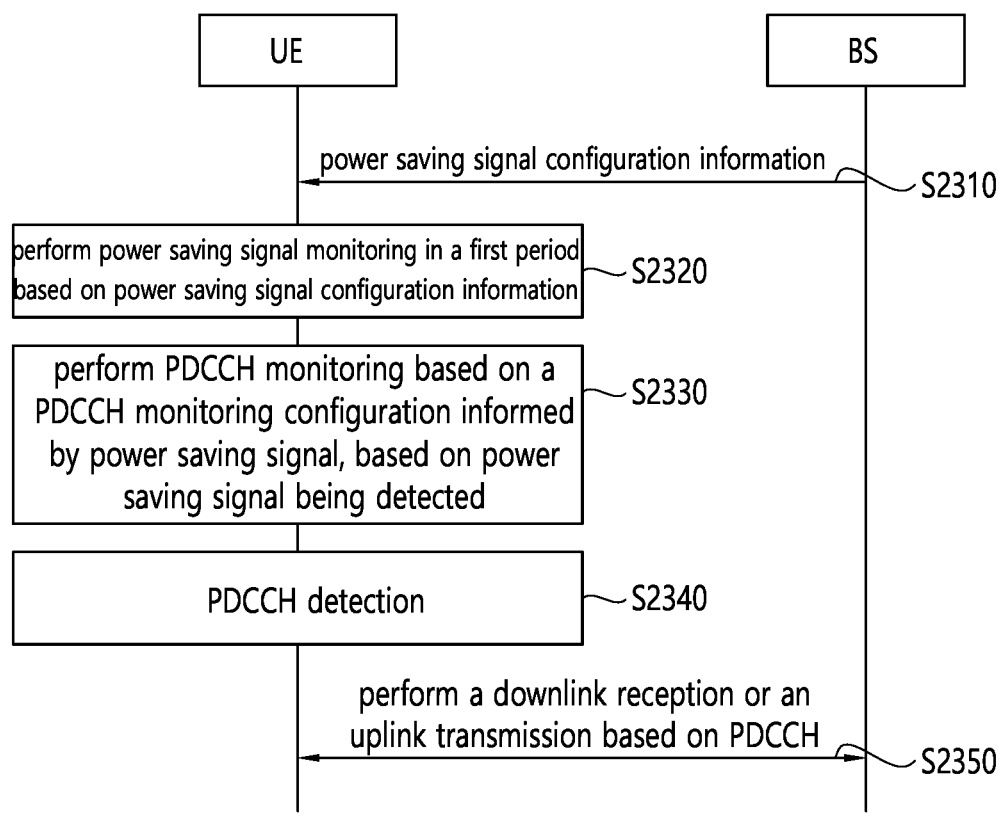
FIG. 23 is a flowchart of an example of an operation of a UE according to some implementations of the present disclosure.

FIG. 23 is a flowchart of an example of an operation of a UE according to some implementations of the present disclosure.

Referring to FIG. 23, a base station transmits power saving signal configuration information to a UE (S2310). Here, for example, the power saving signal configuration information may inform the UE of a monitoring period of the power saving signal.

The UE performs power saving signal monitoring in a first period based on the power saving signal configuration information (S2320). Here, the first period may be a monitoring period of the power saving signal informed by the power saving signal configuration information.

The UE performs PDCCH monitoring based on a PDCCH monitoring configuration informed by the power saving signal, based on the power saving signal being detected (S2330).

The UE detects PDCCH (S2340), and performs a downlink reception or an uplink transmission based on the PDCCH (S2350).

Specifically, the UE may perform monitoring of a power saving signal based on the power saving signal configuration indicated by the network, and when detecting the power saving signal, a PDCCH monitoring configuration indicated by the power saving signal may be applied to subsequent PDCCH monitoring.

In order to reduce the power consumption required for PDCCH monitoring, a period, a duration and a bandwidth of the power saving signal monitoring and a period, a duration and a bandwidth of PDCCH monitoring indicated/configured by the detected power saving signal may be variously configured as follows. Meanwhile, the bandwidth may mean a bandwidth part.

For example, the power saving signal monitoring may be performed in a first period, and the PDCCH monitoring may be performed in a second period. The first period may be same as or different from the second period. For example, the first period may be greater than the second period. Alternatively, the first period may be smaller than the second period.

In addition, the power saving signal monitoring may be performed in a first duration, and the PDCCH monitoring may be performed in a second duration. The first duration may be same as or different from the second duration. For example, the first duration may be greater than the second duration. Alternatively, the first duration may be smaller than the second duration.

In addition, the power saving signal monitoring may be performed in a first bandwidth, and the PDCCH monitoring may be performed in a second bandwidth. The first bandwidth may be same as or different from the second bandwidth. For example, the first bandwidth may be greater than the second bandwidth. Alternatively, the first bandwidth may be smaller than the second bandwidth.

Meanwhile, the network may determine a PDCCH monitoring configuration that can reduce power consumption of a UE based on a feedback from the UE or a data transmission/reception pattern for the UE, and the selected/determined PDCCH monitoring configuration may be indicated to the UE through a power saving signal. The UE may perform monitoring of the power saving signal based on the power saving signal configuration indicated by the network, and when the power saving signal is detected, the PDCCH monitoring configuration indicated by the power saving signal may be applied to subsequent PDCCH monitoring.

Figure 24:
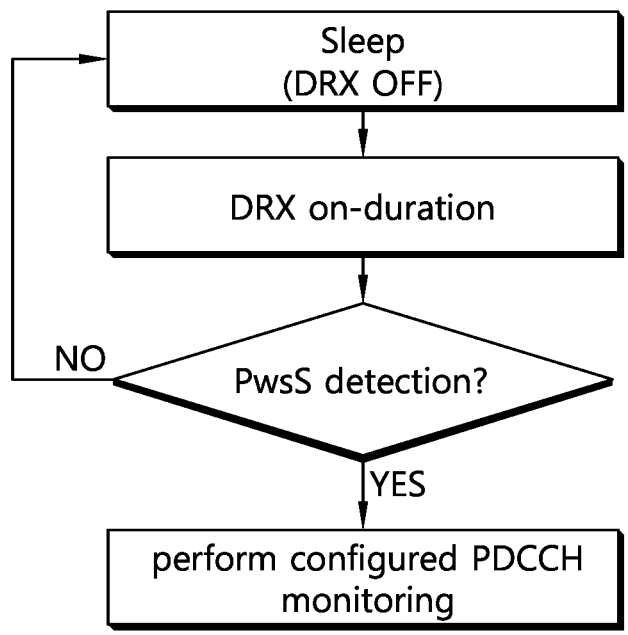
FIG. 24 is a flowchart for an example of an operation of a UE according to some implementations of the present disclosure when a power saving signal operates as a wake-up signal.

FIG. 24 is a flowchart for an example of an operation of a UE according to some implementations of the present disclosure when a power saving signal operates as a wake-up signal.

Referring to FIG. 24, the UE may be in a sleep state and an on-duration period may start. Here, the UE may perform monitoring of a power saving signal. Here, when the power saving signal is detected, the UE may perform a configured PDCCH monitoring, and when the power saving signal is not detected, the UE may enter a sleep state.

Since the operation of the UE related to FIG. 24 may be performed based on the proposals of the present disclosure, a duplicate description will be omitted.

Figure 25:
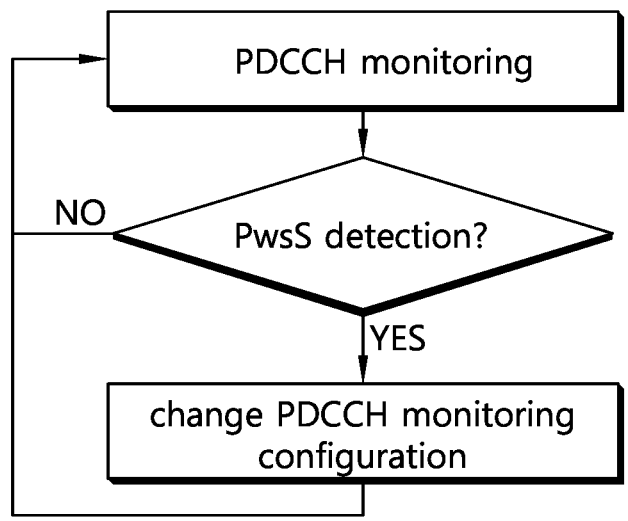
FIG. 25 is a flowchart for an example of an operation of a UE according to some implementations of the present disclosure when a power saving signal changes a PDCCH monitoring configuration.

FIG. 25 is a flowchart for an example of an operation of a UE according to some implementations of the present disclosure when a power saving signal changes a PDCCH monitoring configuration.

Referring to FIG. 25, the UE performs monitoring of a power saving signal. Here, when the power saving signal is not detected, the UE performs PDCCH monitoring. Also, when the power saving signal is detected, the UE changes a PDCCH monitoring configuration and performs the PDCCH monitoring based on the changed PDCCH monitoring configuration.

Since the operation of the UE related to FIG. 25 may be performed based on the proposals of the present disclosure, a duplicate description will be omitted.

Figure 26:
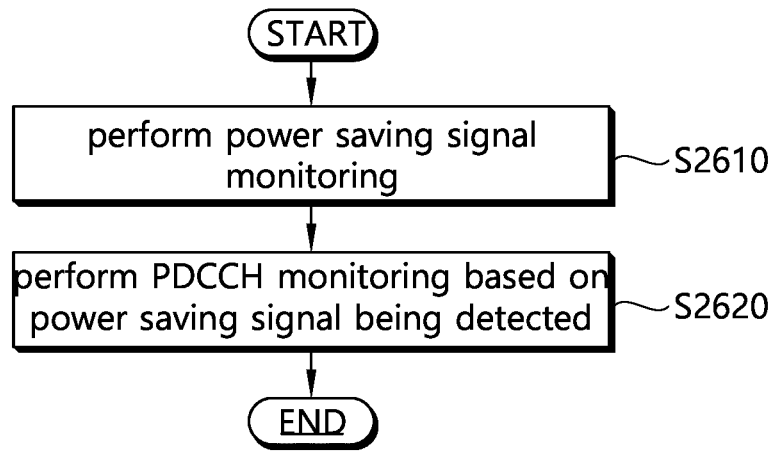
FIG. 26 is a flowchart of a method for performing PDCCH monitoring performed by a UE according to some implementations of the present disclosure.

FIG. 26 is a flowchart of a method for performing PDCCH monitoring performed by a UE according to some implementations of the present disclosure.

Referring to FIG. 26, the UE performs power saving signal monitoring (S2610).

Based on the power saving signal being detected, the UE performs PDCCH monitoring (S2620).

Here, the power saving signal may include configuration information related to the PDCCH monitoring. Specific examples related to the configuration information are the same as described above, and thus a duplicate description will be omitted.

Claims in this specification may be combined in various ways. For instance, technical features of method claims of the specification may be combined to be implemented or performed in an apparatus, and technical features of apparatus claims may be combined to be implemented or performed in a method. Further, technical features of method claim(s) and technical features of apparatus claim(s) may be combined to be implemented or performed in an apparatus, and technical features of method claim(s) and technical features of apparatus claim(s) can be combined to be implemented or performed in a method.

The methods proposed herein may be performed by not only a UE but also at least one computer-readable medium including an instruction executed by at least one processor and an apparatus configured to control a UE, the apparatus including at least one processor and at least one memory that is operatively connected to the at least one processor and stores instructions, and the at least one processor executing the instructions to perform the methods proposed herein.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 27:
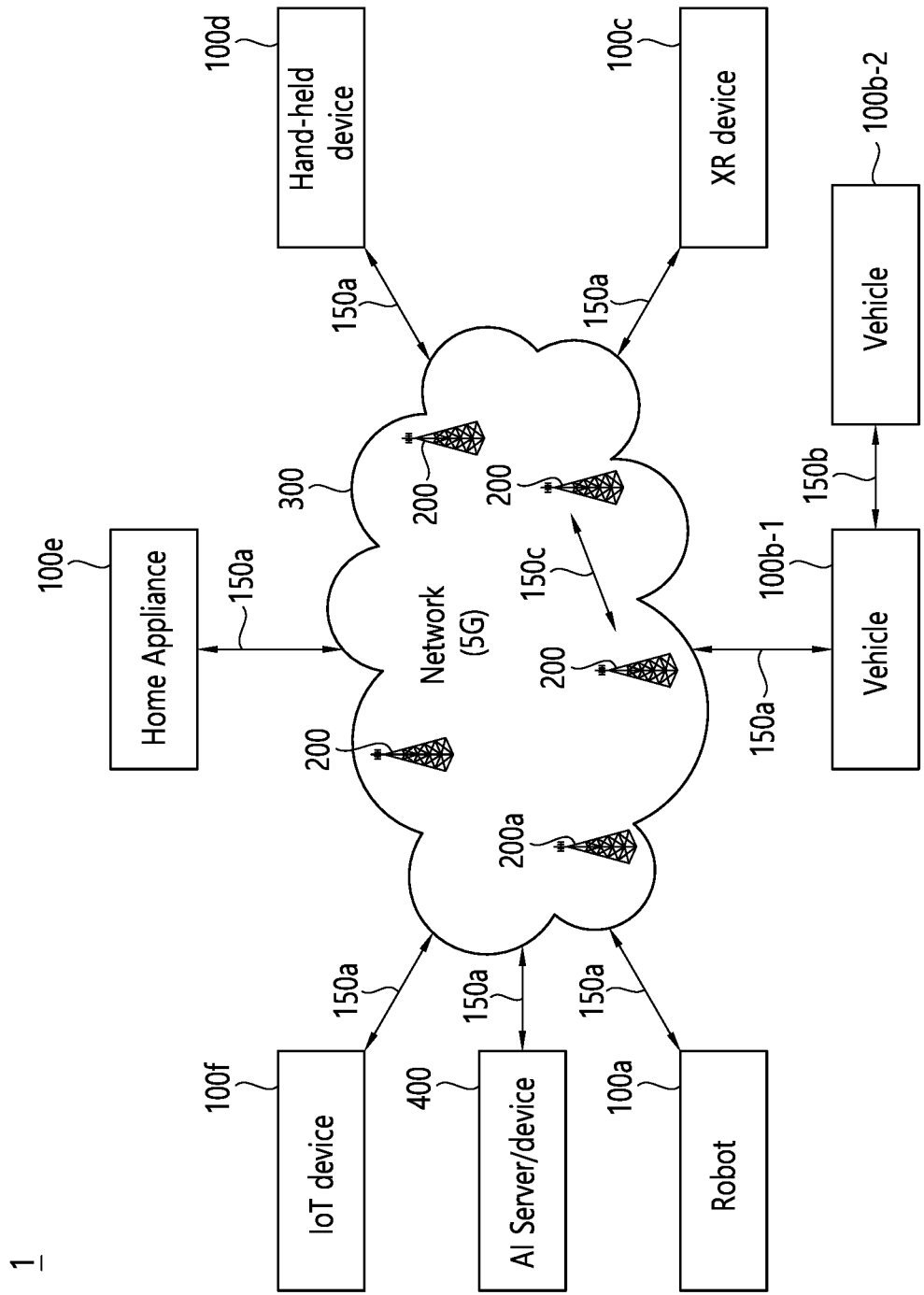
FIG. 27 illustrates a communication system 1 applied to the disclosure.

FIG. 27 illustrates a communication system 1 applied to the disclosure.

Referring to FIG. 27, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Meanwhile, NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 7. For convenience of description, FR1 of the frequency ranges used for an NR system may refer to a "sub 6 GHz range", and FR2 may refer to an "above 6 GHz range" and may be referred to as a millimeter wave (mmW).

TABLE 7

| Frequency range designation | Corresponding frequency range | Subcarrier spacing |
| --- | --- | --- |
| FR1 | 450 MHz-6000 MHz | 15, 30, 60 kHz |
| FR2 | 24250 MHz-52600 MHz | 60, 120, 240 kHz |

As illustrated above, the values of the frequency ranges for the NR system may be changed. For example, FR1 may include a band from 410 MHz to 7125 MHz as shown in Table 8. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 8

| Frequency range | Corresponding frequency designation | Subcarrier spacing range |
| --- | --- | --- |
| FR1 | 410 MHz-7125 MHz | 15, 30, 60 kHz |
| FR2 | 24250 MHz-52600 MHz | 60, 120, 240 kHz |

Hereinafter, an example of a wireless device to which the disclosure is applied is described.

Figure 28:
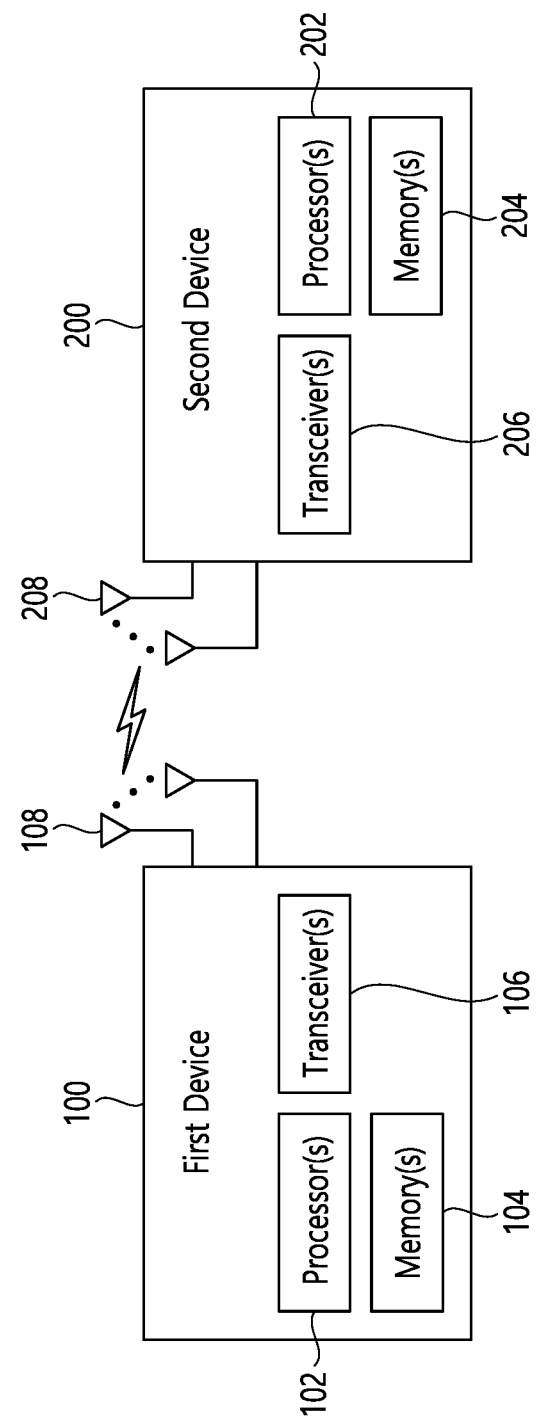
FIG. 28 illustrates a wireless device that is applicable to the disclosure.

FIG. 28 illustrates a wireless device that is applicable to the disclosure.

Referring to FIG. 28, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 27 and/or may respectively correspond to a wireless device 100x and a wireless device 100x of FIG. 27.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein.

For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Hereinafter, an example of a signal processing circuit to which the disclosure is applied is described.

Figure 29:
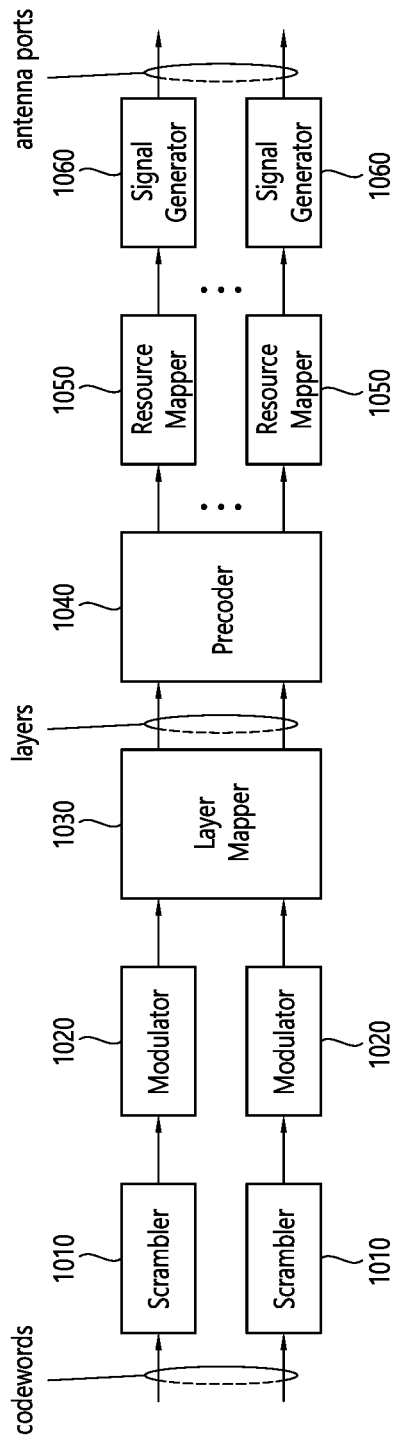
FIG. 29 illustrates a signal processing circuit for a transmission signal.

FIG. 29 illustrates a signal processing circuit for a transmission signal.

Referring to FIG. 29, the signal processing circuit 1000 may include a scrambler 1010, a modulator 1020, a layer mapper 1030, a precoder 1040, a resource mapper 1050, and a signal generator 1060. Operations/functions illustrated with reference to FIG. 29 may be performed, but not limited to, in the processor 102 and 202 and/or the transceiver 106 and 206 of FIG. 28. Hardware elements illustrated in FIG. 29 may be configured in the processor 102 and 202 and/or the transceiver 106 and 206 of FIG. 28. For example, blocks 1010 to 1060 may be configured in the processor 102 and 202 of FIG. 28. Alternatively, blocks 1010 to 1050 may be configured in the processor 102 and 202 of FIG. 28, and a block 1060 may be configured in the transceiver 106 and 206 of FIG. 28.

A codeword may be converted into a radio signal via the signal processing circuit 1000 of FIG. 29. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 29. For example, a wireless device (e.g., 100 and 200 of FIG. 28) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Hereinafter, an example of utilizing a wireless device to which the disclosure is applied is described.

Figure 30:
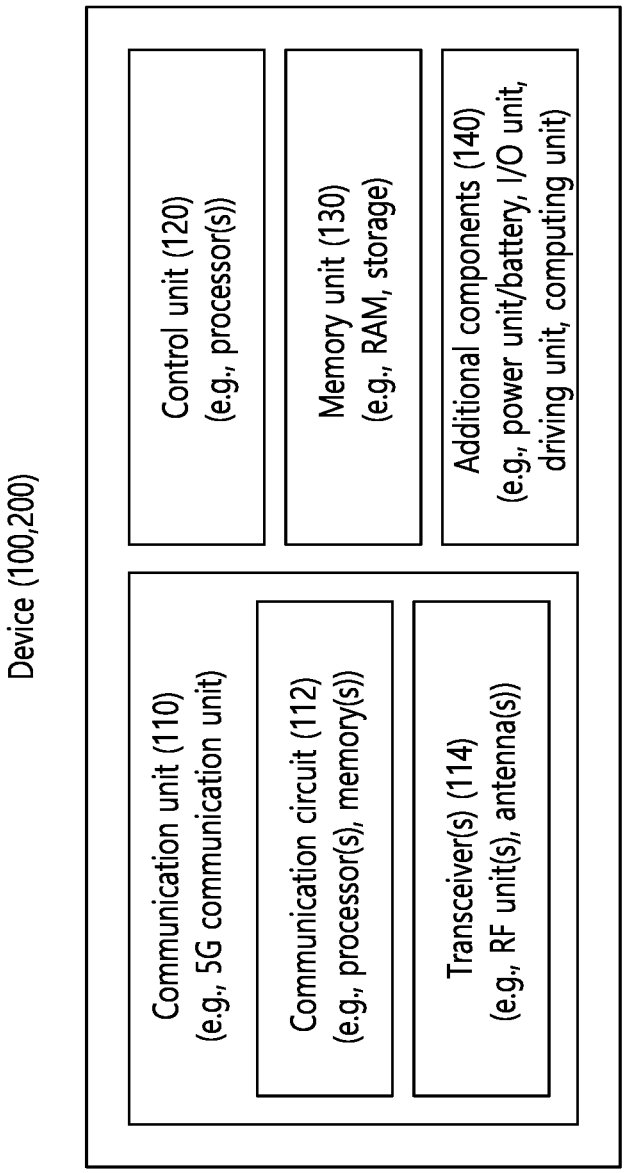
FIG. 30 illustrates another example of a wireless device applied to the disclosure.

FIG. 30 illustrates another example of a wireless device applied to the disclosure. The wireless device may be configured in various forms depending on usage/service.

Referring to FIG. 30, the wireless devices 100 and 200 may correspond to the wireless device 100 and 200 of FIG. 28 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 28. For example, the transceiver(s) 114 may include the at least one transceiver 106 and 206 and/or the at least one antenna 108 and 208 of FIG. 28. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 27), a vehicle (100 b-1 or 100 b-2 in FIG. 27), an XR device (100 c in FIG. 27), a hand-held device (100 d in FIG. 27), a home appliance (100e in FIG. 27), an IoT device (100f in FIG. 27), a terminal for digital broadcasting, a hologram device, a public safety device, an MTC device, a medical device, a fintech device (or financial device), a security device, a climate/environmental device, an AI server/device (400 in FIG. 27), a base station (200 in FIG. 27), a network node, or the like. The wireless device may be mobile or may be used in a fixed place depending on usage/service.

In FIG. 30, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 30 is described in detail with reference to the accompanying drawing.

Hereinafter, an example of a hand-held device to which the disclosure is applied is described.

Figure 31:
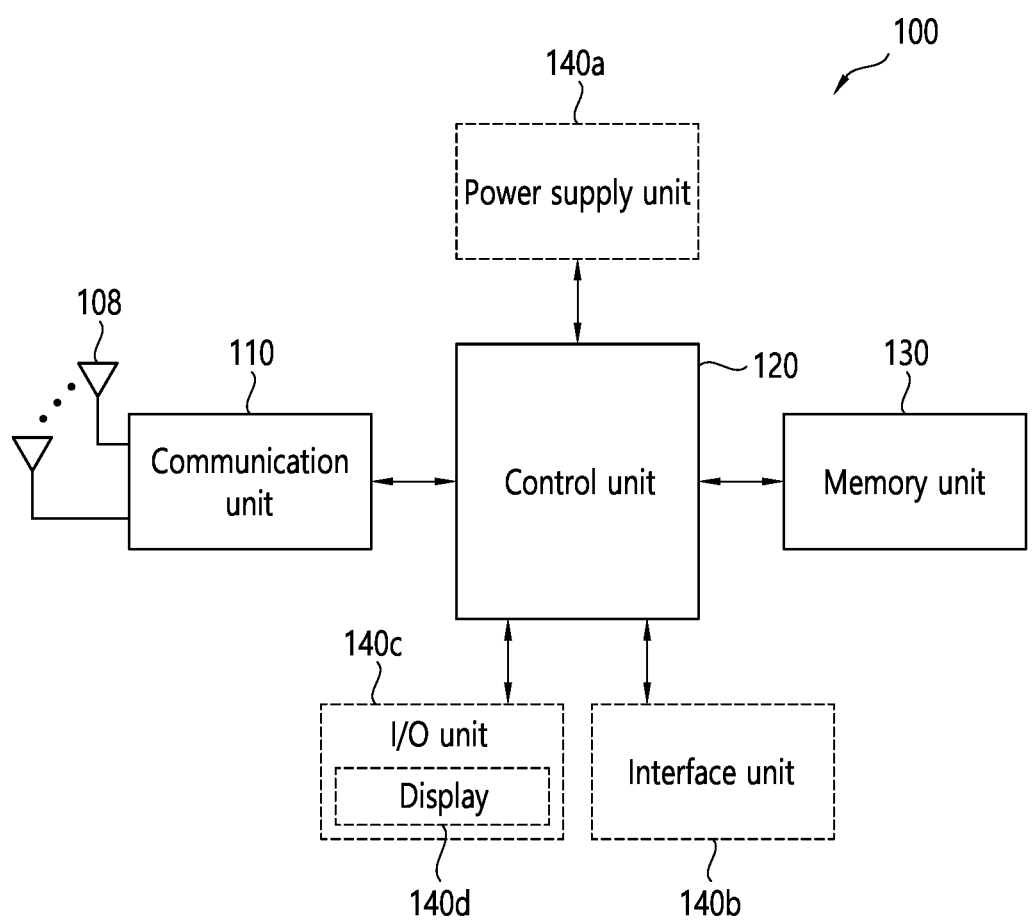
FIG. 31 illustrates a hand-held device applied to the disclosure.

FIG. 31 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 31, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 30, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Hereinafter, an example of a vehicle or an autonomous driving vehicle to which the disclosure is applied is described.

Figure 32:
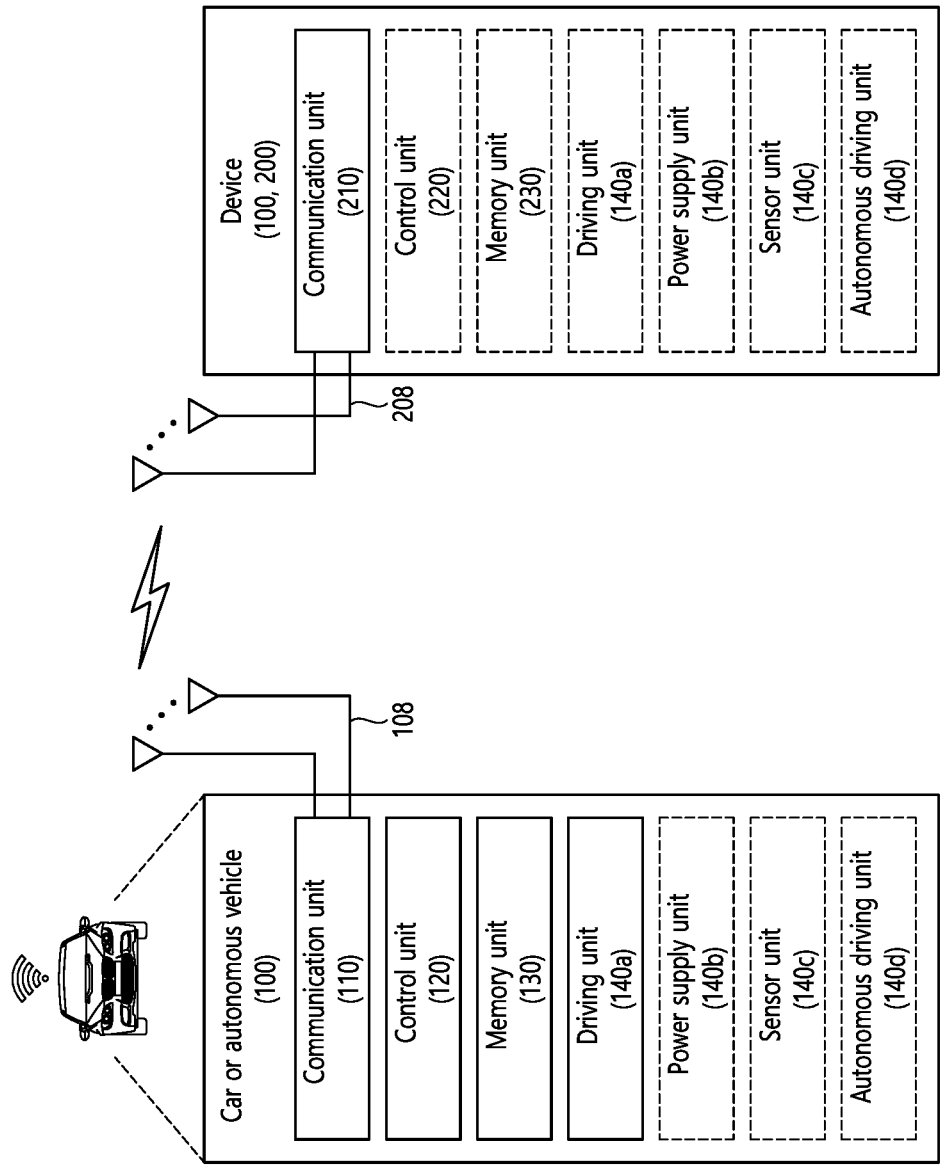
FIG. 32 illustrates a vehicle or an autonomous driving vehicle applied to the disclosure.

FIG. 32 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 32, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 30, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Hereinafter, an example of a AR (augmented reality)/VR (virtual reality) device and a vehicle to which the disclosure is applied is described.

Figure 33:
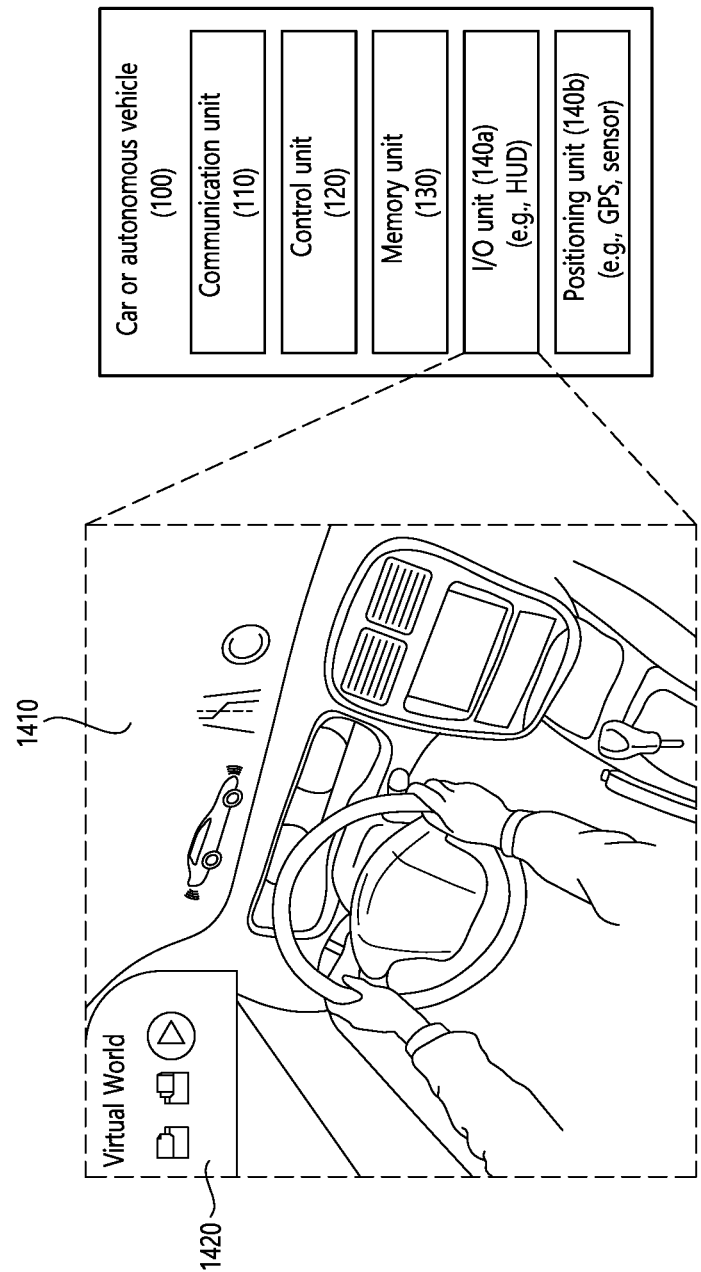
FIG. 33 illustrates a vehicle applied to the disclosure.

FIG. 33 illustrates a vehicle applied to the disclosure. The vehicle may be implemented as a means of transportation, a train, an air vehicle, a ship, and the like.

Referring to FIG. 33, the vehicle 100 may include a communication unit 110, a control unit 120, a memory unit 130, an input/output unit 140a, and a positioning unit 140b. Herein, blocks 110 to 130/140a to 140b correspond to block 110 to 130/140 of FIG. 30, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140b may acquire position information of the vehicle 100. The location information may include absolute location information of the vehicle 100, location information within a driving line, acceleration information, location information with a neighboring vehicle, and the like. The positioning unit 140b may include a GPS and various sensors.

For example, the communication unit 110 of the vehicle 100 may receive map information, traffic information, and the like from an external server and store it in the memory unit 130. The positioning unit 140b may obtain vehicle position information through GPS and various sensors and store it in the memory unit 130. The control unit 120 may generate a virtual object based on map information, traffic information, vehicle location information, and the like, and the input/output unit 140a may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140a. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Hereinafter, an example of a XR (extended reality) device to which the disclosure is applied is described.

Figure 34:
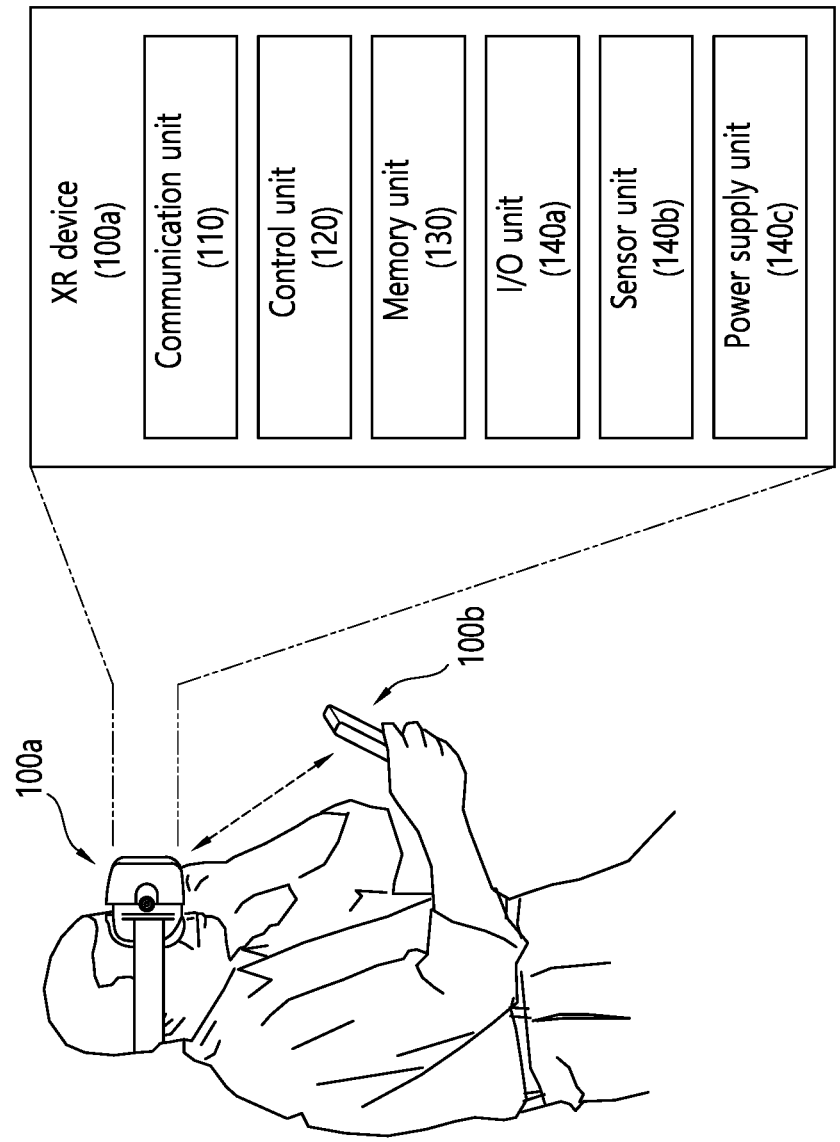
FIG. 34 illustrates a XR device applied to the disclosure.

FIG. 34 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 34, the XR device 100a may include a communication unit 110, a control unit 120, a memory unit 130, an input/output unit 140a, a sensor unit 140b and a power supply unit 140c. Herein, blocks 110 to 130/140a to 140c correspond to blocks 110 to 130/140 in FIG. 30.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100a to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100a/creating an XR object. The input/output unit 140a may obtain control information, data, and the like from the outside, and may output the generated XR object. The input/output unit 140a may include a camera, a microphone, a user input unit, a display unit, a speaker, and/or a haptic module. The sensor unit 140b may obtain an XR device state, surrounding environment information, user information, and the like. The sensor unit 140b may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140c supplies power to the XR device 100a, and may include a wired/wireless charging circuit, a battery, and the like.

For example, the memory unit 130 of the XR device 100a may include information (e.g., data, etc.) necessary for generating an XR object (e.g., AR/VR/MR object). The input/output unit 140a may obtain a command to operate the XR device 100a from the user, and the control unit 120 may drive the XR device 100a according to the user's driving command. For example, when the user wants to watch a movie or news through the XR device 100a, the control unit 120 transmits the content request information through the communication unit 130 to another device (e.g., the mobile device 100b) or can be sent to the media server. The communication unit 130 may download/stream contents such as movies and news from another device (e.g., the portable device 100b) or a media server to the memory unit 130. The control unit 120 controls and/or performs procedures such as video/image acquisition, (video/image) encoding, and metadata generation/processing for the content, and is acquired through the input/output unit 140a/the sensor unit 140*b* An XR object can be generated/output based on information about one surrounding space or a real object.

Also, the XR device 100*a* is wirelessly connected to the portable device 100*b* through the communication unit 110, and the operation of the XR device 100*a* may be controlled by the portable device 100*b*. For example, the portable device 100*b* may operate as a controller for the XR device 100*a*. To this end, the XR device 100*a* may obtain 3D location information of the portable device 100*b*, and then generate and output an XR object corresponding to the portable device 100*b*.

Hereinafter, an example of a robot to which the disclosure is applied is described.

Figure 35:
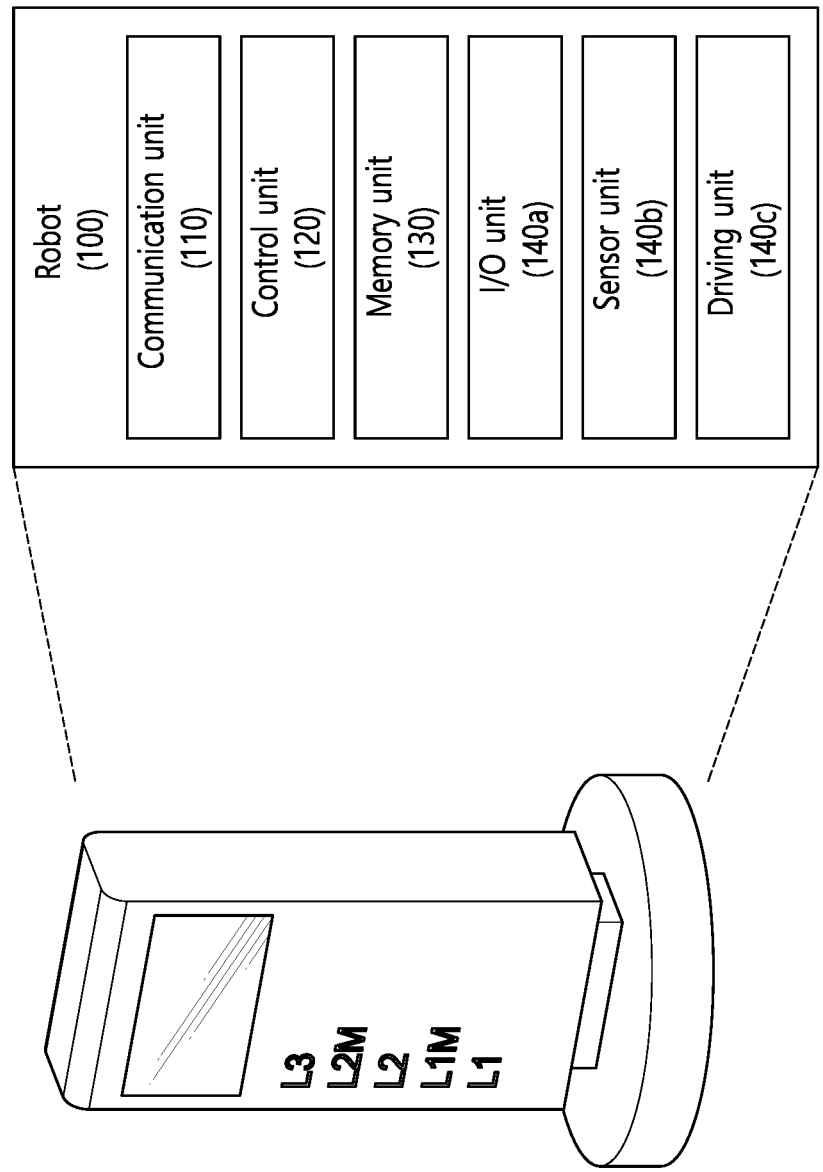
FIG. 35 illustrates a robot applied to the disclosure.

FIG. 35 illustrates a robot applied to the disclosure. The robot may be classified into industrial, medical, home, military, and the like depending on the purpose or field of use.

Referring to FIG. 35, the robot 100 may include a communication unit 110, a control unit 120, a memory unit 130, an input/output unit 140*a*, a sensor unit 140*b*, and a driving unit 140*c*. Herein, blocks 110 to 130/140*a* to 140*c* correspond to blocks 110 to 130/140 in FIG. 30.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140*a* may obtain information from the outside of the robot 100 and may output information to the outside of the robot 100. The input/output unit 140*a* may include a camera, a microphone, an user input unit, a display unit, a speaker, and/or a haptic module, etc. The sensor unit 140*b* may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140*c* may perform various physical operations such as moving a robot joint. In addition, the driving unit 140*c* may make the robot 100 travel on the ground or fly in the air. The driving unit 140*c* may include an actuator, a motor, a wheel, a brake, a propeller, and the like.

Hereinafter, an example of an AI (artificial intelligence) device to which the disclosure is applied is described.

Figure 36:
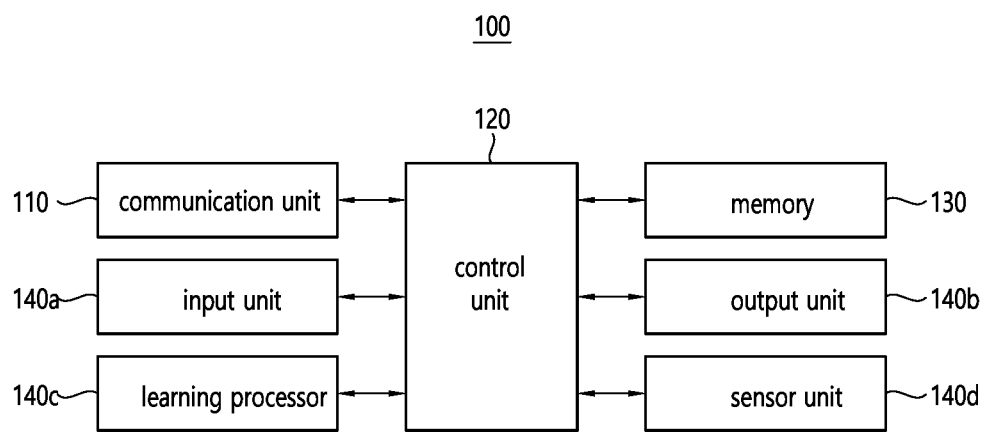
FIG. 36 illustrates an AI device applied to the disclosure.

FIG. 36 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 36, the AI device 100 may include a communication unit 110, a control unit 120, a memory unit 130, an input unit 140*a*, an output unit 140*b*, a learning processor unit 140*c*, and a sensor unit 140*d*. Blocks 110 to 130/140*a* to 140*d* correspond to the blocks 110 to 130/140 of FIG. 30, respectively.

The communication unit 110 may transmit and receive wired or wireless signals (e.g., sensor information, a user input, a learning mode, a control signal, or the like) to and from external devices, a different AI device (e.g., 100*x*, 200, or 400 in FIG. 27) or an AI server (e.g., 400 in FIG. 27) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140*c* or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140*c* or may transmit the history information to an external device, such as the AI server (400 in FIG. 27). The collected history information may be used to update a learning model.

The memory unit 130 may store data for supporting various functions of the AI device 100. For example, the memory unit 130 may store data obtained from the input unit 140*a*, data obtained from the communication unit 110, output data from the learning processor unit 140*c*, and data obtained from the sensing unit 140. Further, the memory unit 130 may store control information and/or a software code necessary for the operation/execution of the control unit 120.

The input unit 140*a* may obtain various types of data from the outside of the AI device 100. For example, the input unit 140*a* may obtain learning data for model learning and input data to which a learning model is applied. The input unit 140*a* may include a camera, a microphone, and/or a user input unit. The output unit 140*b* may generate visual, auditory, or tactile output. The output unit 140*b* may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140*c* may train a model including artificial neural networks using learning data. The learning processor unit 140*c* may perform AI processing together with a learning processor unit of an AI server (400 in FIG. 27). The learning processor unit 140*c* may process information received from an external device through the communication unit 110 and/or information stored in the memory unit 130. In addition, an output value from the learning processor unit 140*c* may be transmitted to an external device through the communication unit 110 and/or may be stored in the memory unit 130.

What is claimed is:

1. A method for performing physical downlink control channel (PDCCH) monitoring in a wireless communication system, the method performed by a user equipment (UE) and comprising:

receiving a power saving signal configuration from a network;

monitoring the power saving signal at more than one monitoring occasion before a next on-duration based on the power saving signal configuration, wherein the power saving signal is downlink control information (DCI) on a physical downlink control channel (PDCCH), and
wherein the DCI is related to a power saving radio network temporary identity (PS-RNTI); and
based on the power saving signal being detected, performing the PDCCH monitoring at the next on-duration,
wherein the power saving signal includes configuration information related to the PDCCH monitoring,
wherein the configuration information includes a search space set configuration including a monitoring period related to a search space set in which the PDCCH monitoring is performed, a monitoring pattern related to the PDCCH monitoring, a duration, an aggregation level (AL), monitored DCI and a number of candidates, and
wherein the PDCCH monitoring is performed in the search space set based on the search space set configuration.

2. The method of claim 1, wherein the configuration information further includes at least one of a bandwidth part (BWP) in which the PDCCH monitoring is performed, or an application timing of the configuration information.

3. The method of claim 2, wherein the BWP is larger than a BWP in which the power saving signal is monitored.

4. The method of claim 2, wherein the application timing of the configuration information is determined based on a capability of the UE.

5. The method of claim 2, wherein the application timing of the configuration information is a timing at which a feedback signal for the power saving signal is transmitted to a network.

6. The method of claim 5, wherein the feedback signal is hybrid automatic repeat request acknowledgement/negative-acknowledgement (HARQ ACK/NACK).

7. The method of claim 2, wherein the application timing of the configuration information is determined based on a numerology.

8. The method of claim 1, wherein the search space set is all or part of a plurality of search space sets configured for the UE.

9. The method of claim 1, wherein the power saving signal configuration includes at least one of a period or a BWP in which the power saving signal is monitored.

10. The method of claim 1, wherein a period in which the power saving signal is monitored is configured independently per BWP.

11. A user equipment (UE) comprising:
at least one memory to store instructions;
at least one transceiver; and
at least one processor to connect the at least one memory and the at least one transceiver,
wherein the at least one processor executes the instructions to:
receive a power saving signal configuration from a network;
monitor the power saving signal at more than one monitoring occasion before a next on-duration based on the power saving signal configuration,
wherein the power saving signal is downlink control information (DCI) on a physical downlink control channel (PDCCH), and
wherein the DCI is related to a power saving radio network temporary identity (PS-RNTI); and
based on the power saving signal being detected, perform a physical downlink control channel (PDCCH) monitoring at the next on-duration,
wherein the power saving signal includes configuration information related to the PDCCH monitoring,
wherein the configuration information includes a search space set configuration including a monitoring period related to a search space set in which the PDCCH monitoring is performed, a monitoring pattern related to the PDCCH monitoring, a duration, an aggregation level (AL), monitored DCI and a number of candidates, and
wherein the PDCCH monitoring is performed in the search space set based on the search space set configuration.

12. The UE of claim 11, wherein the configuration information further includes at least one of a bandwidth part (BWP) in which the PDCCH monitoring is performed, or an application timing of the configuration information.

13. The UE of claim 12, wherein the BWP is larger than a BWP in which the power saving signal is monitored.

14. The UE of claim 12, wherein the application timing of the configuration information is determined based on a capability of the UE.

15. The UE of claim 12, wherein the application timing of the configuration information is a timing at which a feedback signal for the power saving signal is transmitted to a network.

16. The UE of claim 15, wherein the feedback signal is hybrid automatic repeat request acknowledgement/negative-acknowledgement (HARQ ACK/NACK).

17. The UE of claim 12, wherein the application timing of the configuration information is determined based on a numerology.

18. The UE of claim 11, wherein the search space set is all or part of a plurality of search space sets configured for the UE.

19. The UE of claim 11, wherein the power saving signal configuration includes at least one of a period or a BWP in which the power saving signal is monitored.

20. The UE of claim 11, wherein a period in which the power saving signal is monitored is configured independently per BWP.

* * * * *